(12) United States Patent
Yoshida et al.

(10) Patent No.: US 11,214,408 B2
(45) Date of Patent: Jan. 4, 2022

(54) TUBULAR CONTAINER

(71) Applicant: FUJIMORI KOGYO CO., LTD., Shinjuku-ku (JP)

(72) Inventors: Mihoko Yoshida, Odawara (JP); Toyoaki Suzuki, Yokohama (JP); Atsushi Takematsu, Koto-ku (JP); Yuki Eto, Yokohama (JP); Kosuke Kashima, Yokosuka (JP); Asako Kanazawa, Kawasaki (JP)

(73) Assignee: FUJIMORI KOGYO CO., LTD., Shinjuku-ku (JP)

( * ) Notice: Subject to any disclaimer, the term of this patent is extended or adjusted under 35 U.S.C. 154(b) by 0 days.

(21) Appl. No.: 15/565,010

(22) PCT Filed: Apr. 6, 2016

(86) PCT No.: PCT/JP2016/061199
§ 371 (c)(1),
(2) Date: Oct. 6, 2017

(87) PCT Pub. No.: WO2016/163378
PCT Pub. Date: Oct. 13, 2016

(65) Prior Publication Data
US 2018/0099787 A1   Apr. 12, 2018

(30) Foreign Application Priority Data

Apr. 8, 2015 (JP) .............................. JP2015-079310
Jul. 15, 2015 (JP) .............................. JP2015-141051

(51) Int. Cl.
*B65D 35/08* (2006.01)
*B65D 35/10* (2006.01)
(Continued)

(52) U.S. Cl.
CPC .............. *B65D 35/08* (2013.01); *B32B 15/08* (2013.01); *B65D 35/10* (2013.01); *B65D 35/12* (2013.01);
(Continued)

(58) Field of Classification Search
CPC ...... B65D 35/08; B65D 47/122; B65D 35/14; B65D 35/10; B65D 35/16; B65D 35/18;
(Continued)

(56) References Cited

U.S. PATENT DOCUMENTS 3,260,777 A * 7/1966 Brandt .............. B29C 45/14336
264/262
3,669,323 A * 6/1972 Harker ................... B65D 35/14
222/490

(Continued)

FOREIGN PATENT DOCUMENTS

EP   2 435 331       4/2012
JP   5-124658 A      5/1993
(Continued)

OTHER PUBLICATIONS

International Search Report and Written Opinion dated Jun. 21, 2106, in PCT/JP2016/061199, filed Apr. 6, 2016.
(Continued)

*Primary Examiner* — Robert Poon
(74) *Attorney, Agent, or Firm* — Oblon, McClelland, Maier & Neustadt, L.L.P.

(57) ABSTRACT

To provide a tubular container which has non-absorbing properties with respect to contents as well as gas barrier properties. A tubular container 1 comprises at least an outlet unit 20 provided with an outlet part 21 through which contents are dispensed and a shoulder part 24 that extends radially outward from the outlet part 21; and a body part 10 that is welded to the shoulder part 24 of the outlet unit 20 and
(Continued)

stores the contents therein, wherein the body part 10 comprises at least an innermost layer formed from a non-absorbing resin on an inner side that comes into contact with the contents, an outermost layer formed on an outermost side, and an intermediate layer formed between the innermost layer and the outermost layer and including a gas barrier layer. This tubular container 1 is characterized by a structural form wherein all surfaces coming into contact with the contents are formed from a non-absorbing resin or a structural form with a transparent body part including a gas barrier layer.

20 Claims, 10 Drawing Sheets

(51) Int. Cl.
    *B65D 35/12* (2006.01)
    *B32B 15/08* (2006.01)
    *B65D 47/12* (2006.01)
    *B65D 65/42* (2006.01)
    *B65D 81/26* (2006.01)
    *B65D 85/00* (2006.01)

(52) U.S. Cl.
    CPC ........... *B65D 47/122* (2013.01); *B65D 65/42* (2013.01); *B65D 81/267* (2013.01); *B65D 85/70* (2013.01)

(58) Field of Classification Search
    CPC ........ B65D 35/20; B65D 35/46; B65D 47/10; B65D 47/103; B65D 47/36; B65D 2251/0093; B65D 1/0238; B65D 1/32; B65D 5/741; B65D 17/50; B65D 39/02; B65D 53/08; B65D 35/00; B65D 35/04; B65D 35/44; B65D 47/106; B65D 5/747; B65D 51/185
    USPC ......................................................... 206/277
    See application file for complete search history.

(56) References Cited

U.S. PATENT DOCUMENTS

| | | | | |
|---|---|---|---|---|
| 3,962,006 A * | 6/1976 | Saito | ..................... | B29C 70/766 156/69 |
| 5,277,508 A * | 1/1994 | Gueret | ................... | A45D 40/06 401/68 |
| 5,656,346 A * | 8/1997 | Hirt | ........................ | B65D 35/10 428/36.91 |
| 6,210,766 B1 * | 4/2001 | McLaughlin | .......... | B65D 35/08 222/107 |
| 2003/0064186 A1 | 4/2003 | Mourtada Anselmo et al. | | |
| 2004/0173558 A1 * | 9/2004 | Chen | ...................... | B65D 35/04 215/12.1 |
| 2006/0043106 A1 * | 3/2006 | Pottish | ................... | B65D 35/08 222/92 |
| 2008/0138550 A1 * | 6/2008 | Takahashi | ............... | B32B 27/08 428/35.7 |
| 2008/0311327 A1 * | 12/2008 | Pasbrig | ..................... | B32B 1/08 428/36.7 |
| 2010/0044337 A1 * | 2/2010 | Shibata | ................ | B65D 51/222 215/253 |
| 2012/0118942 A1 | 5/2012 | Egli et al. | | |
| 2014/0203027 A1 * | 7/2014 | Planeta | .................. | B65D 35/08 220/660 |
| 2014/0364547 A1 * | 12/2014 | Iwasaki | ................ | C08G 63/672 524/127 |
| 2015/0096957 A1 * | 4/2015 | Etesse | ..................... | B29C 49/02 215/355 |
| 2015/0344191 A1 * | 12/2015 | Maurice | ............ | B29C 45/14221 215/379 |
| 2017/0312994 A1 * | 11/2017 | Miller | ................. | B29C 66/7234 |

FOREIGN PATENT DOCUMENTS

| | | |
|---|---|---|
| JP | 6-329165 A | 11/1994 |
| JP | 7-206015 A | 8/1995 |
| JP | 9-132251 A | 5/1997 |
| JP | 11-5721 A | 1/1999 |
| JP | 2001-151251 A | 6/2001 |
| JP | 2002-96847 A | 4/2002 |
| JP | 2004-148628 A | 5/2004 |
| JP | 2014-227208 A | 12/2014 |
| WO | WO 03/022699 A1 | 3/2003 |
| WO | WO 2010/135843 A1 | 12/2010 |

OTHER PUBLICATIONS

Extended European Search Report dated Mar. 23, 2018 in European Patent Application No. 16776544.5, citing documents AA, AO and AP therein, 9 pages.

* cited by examiner

TUBULAR CONTAINER

FIELD OF THE INVENTION

The present invention relates to a tubular container, and more particularly to a tubular container having non-absorbing properties with respect to contents as well as gas barrier properties.

BACKGROUND ART

A tubular container comprises at least an outlet part, a shoulder part, and a body part. In this tubular container, a bottom side of the body part is closed. According to such a tubular container, contents are discharged from the outlet part by squeezing the body part that stores the contents by hand. The tubular container is used as a container for storing food, pharmaceuticals, cosmetics, and the like.

The tubular container is formed from a material having non-absorbing properties with respect to the contents. For example, in Patent Document 1, there is proposed a tubular container for storing toothpaste. This tubular container comprises an innermost layer made of an ethylene-vinyl alcohol copolymer having an ethylene content of 35 to 55 mol %, an adhesive resin layer made of a modified olefin-based resin, and a base layer made of an olefin-based resin. According to this invention, the tubular container is regarded as capable of having an absorption amount of L-menthol of 10 μg/container or less.

In Patent Document 2, there is proposed a tubular container obtained by forming a cylindrical tubular main body by extrusion molding. This tubular container comprises an innermost layer formed from a non-absorbing resin. The innermost layer comprises an acrylonitrile-based copolymer layer or an ethylene-vinyl alcohol copolymer layer.

In Patent Document 3, there is proposed a squeezable container formed by blow-molding a multilayer parison and heat-sealing a bottom opening end. In this squeezable container, the multilayer parison comprises an outer layer, an inner layer, and an intermediate layer. The outer layer is formed from an olefin-based resin. The inner layer is a copolyester composed of a diol other than cyclohexane dimethanol and a dicarboxylic acid other than isophthalic acid, and formed from a substantially amorphous copolyester wherein the diol is composed of an ethylene glycol and a diol other than ethylene glycol, and the molar ratio of the ethylene glycol and the diol other than ethylene glycol is within the range of from 50:50 to 95:5. The intermediate layer is formed from an adhesive resin. In the bottom portion of the squeezable container, the inner layers of the heat sealing part are welded together. According to this invention, the squeezable container is regarded as having non-absorbing properties with respect to active ingredients, flavoring agents, and the like of the contents of pharmaceuticals, food, or the like.

On the other hand, when the body part is squeezed by hand, the tubular container may retain the squeezed shape as is. The tubular container that retains the shape of the body part as is changes in outer shape in accordance with the residual amount of the contents when squeezed by hand. Such a tubular container has the advantage of allowing determination of the residual amount of the contents from the external form of the tubular container.

In Patent Document 4, there is proposed a tubular container that encloses a paste material having low fluidity, such as toothpaste, cosmetics, condiments, food, or medicine. In the tubular main body that constitutes this tubular container, a multilayer laminate sheet comprising an innermost layer made of a polyethylene resin and a gas barrier layer is used. An edge of the multilayer laminate sheet is sealed and formed into a cylindrical shape. The gas barrier layer is formed from a metal oxide deposited film, an aluminum foil, or the like.

Patent Documents

Patent Document 1: Japanese Laid-Open Patent Application No. H11-5721
Patent Document 2: Japanese Laid-Open Patent Application No. H09-132251
Patent Document 3: Japanese Laid-Open Patent Application No. 2002-96847
Patent Document 4: Japanese Laid-Open Patent Application No. 2001-151251

SUMMARY OF THE INVENTION

Problems to be Solved by the Invention

The tubular container proposed in Patent Document 1 is for storing toothpaste. The innermost layer of the tubular container comprises an ethylene-vinyl alcohol copolymer. In general, an ethylene-vinyl alcohol copolymer is mainly used when oxygen barrier properties, oil resistance, and chemical resistance are required, and is not necessarily superior in non-absorbing properties. Thus, this tubular container may not sufficiently achieve the effect of non-absorbing properties with respect to substances other than L-menthol.

Further, in the tubular containers proposed in Patent Document 1 and Patent Document 2 and the squeezable container proposed in Patent Document 3, the outlet section and the body section are configured as an integrated body obtained by extrusion-molding a resin. Thus, such a tubular container cannot be formed by members made of different materials, decreasing the degree of freedom of material selection.

The present invention was made to resolve the above problems, and thus it is an object of the present invention to provide a tubular container having non-absorbing properties with respect to contents as well as gas barrier properties.

Means for Solving the Problems (1) A tubular container according to a first aspect of the present invention is a container that has non-absorbing properties with respect to contents as well as gas barrier properties, and allows formation of an outlet unit and a body part using members made of different materials. That is, this tubular container comprises at least an outlet unit that includes an outlet part through which the contents are dispensed and a shoulder part that extends radially outward from the outlet part; and a body part that is made of a laminated film, is welded to the shoulder part of the outlet unit, and stores the contents therein.

Furthermore, this tubular container has the following characteristics. At least the surfaces of the outlet unit that comes into contact with the contents are formed from a non-absorbing resin. In the body part, a first surface side of one side edge of the laminated film is overlapped and welded to a second surface side of the other side edge. One end of the body part in an axial direction is welded to an outer peripheral surface of the shoulder part. On the other end of the body part in the axial direction, inner surfaces are aligned and welded together, or at least the surfaces that come into contact with the contents are welded to a lid member made of a non-absorbing resin. The laminated film comprises at least an innermost layer formed from a non-absorbing resin on an inner side that comes into contact with the contents, an outermost layer formed from a non-absorbing resin on an outermost side, and an intermediate layer formed between the innermost layer and the outermost layer and including a gas barrier layer.

According to this invention, when the outlet unit, the body part, and the lid member are provided, the surfaces that come into contact with the contents along with the lid member are each formed from a non-absorbing resin. Thus, it is possible to form these from different materials and thus increase the degree of freedom of material selection. Further, the innermost layer and the outermost layer of the laminated film that constitutes the body part are formed from a non-absorbing resin, and the intermediate layer comprises a gas barrier layer. This makes it possible to provide a tubular container having non-absorbing properties with respect to the contents as well as gas barrier properties. As a result, the tubular container according to the present invention is capable of smoothly dispensing the contents and preventing a decrease in flavor, efficacy, and the like of the contents.

In the tubular container according to the present invention, the outlet unit is formed from a non-absorbing resin. According to this invention, it is possible to achieve an outlet unit having non-absorbing properties, and provide a tubular container that comprises the outlet unit and has non-absorbing properties.

In the tubular container according to the present invention, the outlet unit comprises at least the innermost layer formed from a non-absorbing resin, the intermediate layer including a gas barrier layer, and the outermost layer formed from a non-absorbing resin. According to this invention, it is possible to achieve an outlet unit having non-absorbing properties and gas barrier properties, and provide a tubular container that comprises the outlet unit and has non-absorbing properties as well as gas barrier properties.

In the tubular container according to the present invention, the gas barrier layer is made of a metal foil, a metal deposited film, or an inorganic vapor-deposited film. According to this invention, it is possible to achieve a body part having non-absorbing properties with respect to the contents as well as gas barrier properties. As a result, a tubular container that prevents a decrease in the flavor, efficacy, and the like of the contents can be provided.

In the tubular container according to the present invention, the laminated film comprises one type or two or more types of resin layers selected from a polyolefin, an adhesive resin, and a thermoplastic elastomer. According to this invention, the body part is formed from the laminated film comprising such a resin layer, and thus the body part is flexible, making it possible to improve the squeezability that allows the contents to be pushed out and dispensed.

(2) A tubular container according to a second aspect of the present invention is a tubular container that has non-absorbing properties with respect to contents as well as gas barrier properties, and allows the contents to be visually checked from outside the tubular container. That is, this tubular container comprises at least an outlet unit that includes an outlet part through which the contents are dispensed and a shoulder part that extends radially outward from the outlet part; and a body part that is welded to the shoulder part of the outlet unit, and stores the contents therein. Furthermore, the body part is a transparent body part comprising at least an innermost layer formed from a non-absorbing resin on an inner side that comes into contact with the contents, an outermost layer formed on an outermost side, and an intermediate layer formed between the innermost layer and the outermost layer and including a gas barrier layer.

According to this invention, a transparent body part that comprises a gas barrier layer is formed, allowing the contents to be checked from outside the tubular container and imparting gas barrier properties. As a result, the residual amount and the like of the contents can be visually checked, and a decrease in the flavor, efficacy, and the like of the contents can be suppressed. Further, the innermost layer of the body part is formed from a non-absorbing resin, making it possible to suppress the absorption of the active ingredients and the like of the contents to the tubular container. Note that the body part can be formed into a cylindrical shape by extrusion molding or by overlapping the side edges of a laminated film having a rectangular shape, making it possible to provide a tubular container having various forms.

In the tubular container according to the present invention, one end of the body part in the axial direction is welded to the outer peripheral surface of the shoulder part. On the other end of the body part in the axial direction, the inner surfaces are aligned and welded together or welded to the lid member. According to this invention, as long as the material of the shoulder part of the outlet unit and the material of the innermost layer of the body part to be welded to the shoulder part are the same, the materials used for the layers of the body part other than the innermost layer can be materials different from that of the outlet unit. Further, even when the body part and the lid member are welded at the other end of the body part in the axial direction, as long as the material of the lid member and the material of the innermost layer or the outermost layer of the body part to be welded to the lid member are the same, the materials used for other layers of the body part can be materials different from the material of the lid member. As a result, a tubular container having various forms can be provided.

In the tubular container according to the present invention, at least the surfaces of the outlet unit and the lid member that come into contact with the contents are formed from a non-absorbing resin. According to this invention, it is possible to suppress the absorption of the active ingredients and the like of the contents to the tubular container.

In the tubular container according to the present invention, the outlet unit and the body part are integrated by extrusion molding in the same layer configuration as that of the body part, and the inner surfaces of the other end of the body part in the axial direction are aligned and welded together or the lid member is welded. According to this invention, it is possible to impart transparency, gas barrier properties, and non-absorbing properties not only to the body part but to the outlet unit as well. Note that, because the body part and the outlet unit are integrated by extrusion molding, a tubular container having various forms can be provided.

In the tubular container according to the present invention, the gas barrier layer is formed from one type or two or more types of resin selected from an ethylene-vinyl alcohol copolymer resin, a polyvinyl alcohol resin, a polyamide resin, and a polyvinylidene chloride resin. According to this invention, the tubular container comprises the body part that includes the gas barrier layer formed from a transparent resin described above, making it possible to form the body part using a laminated film including a transparent gas barrier layer, form the body part by extrusion molding, and provide a tubular container having various forms.

In the tubular container according to the present invention, the gas barrier layer has oxygen absorbency or an area between the gas barrier layer and the innermost layer comprises an oxygen absorbing layer. According to this invention, the intermediate layer may comprise the gas barrier layer having oxygen absorbency, or may comprise an oxygen absorbing layer separate from the gas barrier layer. With the intermediate layer having oxygen absorbency, the oxygen that exists inside the tubular container is absorbed, making it possible to suppress the occurrence of oxidation of the contents and the like as well.

In the tubular container according to the present invention, the intermediate layer is a transparent deposited layer having gas barrier properties. According to this invention, it is possible to impart transparency and gas barrier properties to the intermediate layer.

Effect of the Invention

According to a first aspect of the present invention, it is possible to provide a new tubular container that has non-absorbing properties with respect to contents as well as gas barrier properties, and allows an outlet unit and a body part to be different members.

According to a second aspect of the present invention, it is possible to provide a tubular container that has non-absorbing properties as well as gas barrier properties, allows contents to be visually checked from outside the tubular container, and has various forms.

BRIEF DESCRIPTION OF THE DRAWINGS

FIG. 4A is a view of the body part with the side edges of both sides of the laminated film overlapped and sealed together. FIG. 4B is a view of the body part with the resin extrusion-molded.

EMBODIMENTS OF THE INVENTION

A tubular container according to the present invention will now be described in detail with reference to drawings. Note that the present invention can be variously modified as long as imparted with the technical features thereof, and is not limited to the embodiments specifically indicated below.

Figure 1:
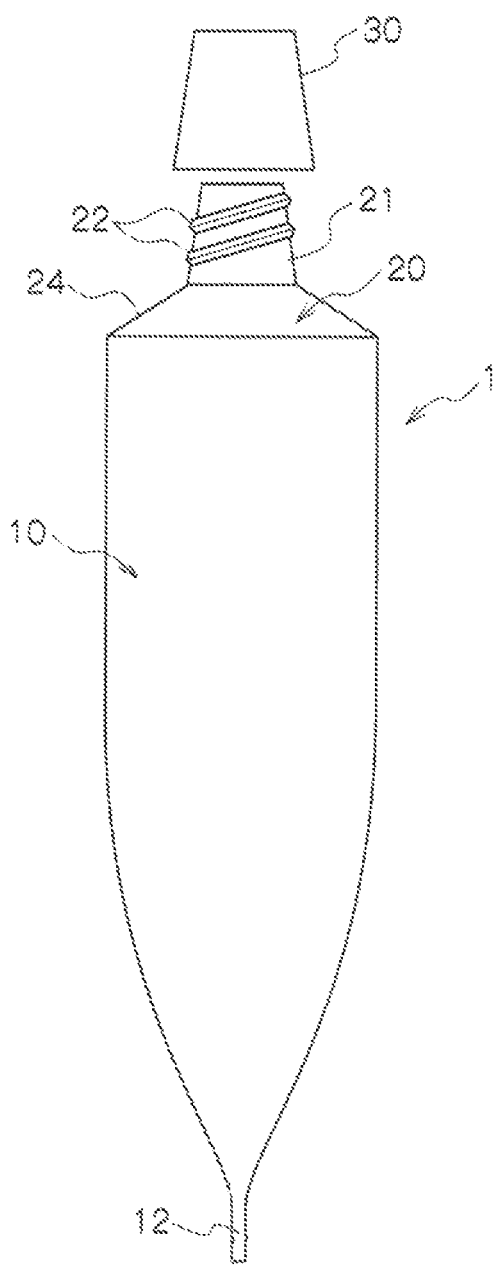
FIG. 1 is a plan view of one example of a tubular container according to the present invention, as viewed from a side.

A tubular container 1 according to the present invention includes the tubular container of the first aspect and the tubular container of the second aspect. Each of these tubular containers 1, as illustrated in FIG. 1, comprises at least an outlet unit 20 provided with an outlet part 21 through which contents are dispensed and a shoulder part 24 that extends radially outward from the outlet part 21, and a body part 10 that is welded to the shoulder part 24 of the outlet unit 20 and stores the contents therein. Then, the body part 10 comprises at least an innermost layer 16 formed from a non-absorbing resin on an inner side that comes into contact with the contents, an outermost layer 18 formed on an outermost side, and an intermediate layer 17 formed between the innermost layer 16 and the outermost layer 18 and including a gas barrier layer.

Specifically, the tubular container 1 according to the first aspect has the following two characteristics. (a) At least the surfaces of the outlet unit 20 that come into contact with the contents are formed from a non-absorbing resin. (b) The body part 10 is formed by a laminated film 15, and the laminated film 15 comprises at least the innermost layer 16 formed from a non-absorbing resin on an inner side that comes into contact with the contents, the outermost layer 18 formed from a non-absorbing resin on the outermost side, and the intermediate layer 17 formed between the innermost layer 16 and the outermost layer 18 and including the gas barrier layer. All surfaces of this tubular container 1 that come into contact with the contents are formed from a non-absorbing resin, making it possible to smoothly dispense the contents. Further, because the body part comprises the gas barrier layer, a decrease in the flavor, efficacy, and the like of the contents can be prevented.

Further, the tubular container according to the second aspect is characterized by the body part 10 being, regardless of formation means (extrusion molding or weld of the laminated film), a transparent body part comprising at least the innermost layer 16 formed from a non-absorbing resin on an inner side that comes into contact with the contents, the outermost layer 18 formed on the outermost side, and the intermediate layer 17 formed between the innermost layer 16 and the outermost layer 18 and including the gas barrier layer. This tubular container 1 comprises the transparent body part that includes the gas barrier layer, making it possible to check the contents from outside the tubular container to visually check the residual amount and the like of the contents, and suppress a decrease in flavor, efficacy, and the like of the contents. Further, the innermost layer 16 of the body part 10 is formed from a non-absorbing resin, making it possible to suppress the absorption of the active ingredients and the like of the contents to the tubular container.

These tubular containers are described in detail below. Note that, in this specification, "non-absorbing properties" refers to properties by which absorption of the active ingredients contained in the contents of food, pharmaceuticals, cosmetics, or the like is less likely. "Gas barrier properties" refers to properties by which passage of a gas such as oxygen or water vapor is less likely. Further, "inner surface" refers to a surface that comes into contact with the contents.

[Tubular Container of the First Aspect]
<Basic Configuration>

Figure 2:
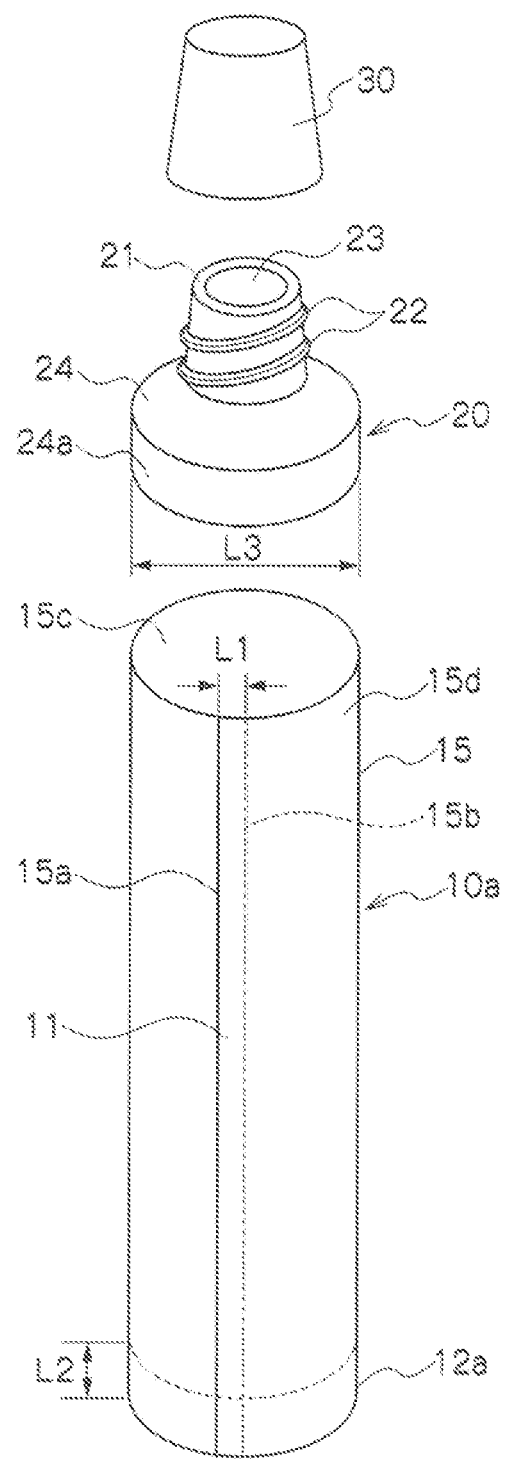
FIG. 2 is an explanatory view of each part of the tubular container illustrated in FIG. 1 for a type in which a body part is formed by overlapping and sealing side edges of both sides of a laminated film together.

The tubular container 1 according to the first aspect, as illustrated in FIGS. 1 and 2, comprises at least the outlet unit 20 for dispensing the contents, and the body part 10 that stores the contents and is welded to the shoulder part 24 of the outlet unit 20.

The outlet unit 20 comprises the outlet part 21 through which the contents are dispensed, and the shoulder part 24 extending radially outward from the outlet part 21. This outlet unit 20 is formed from a resin, and at least the surfaces thereof that come into contact with the contents are formed from a non-absorbing resin.

Figure 4A:
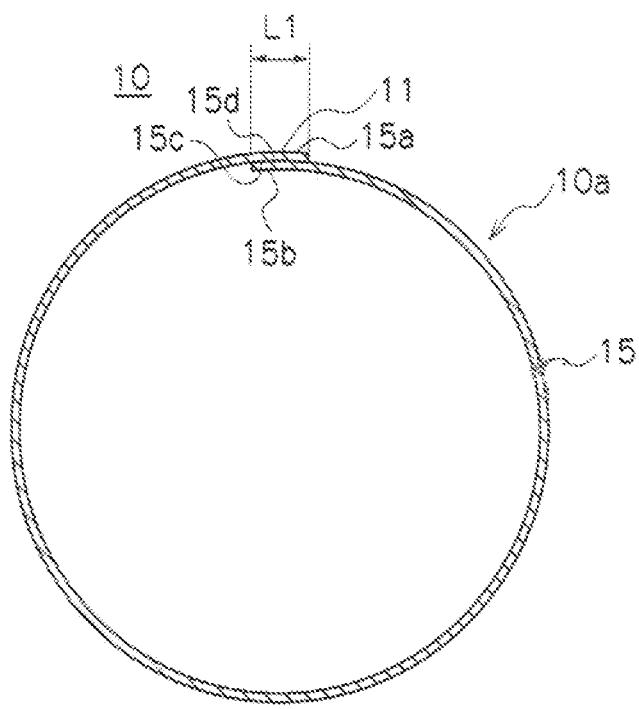
FIGS. 4A and 4B are cross-sectional views for explaining a structure of the body part.
Figure 9:
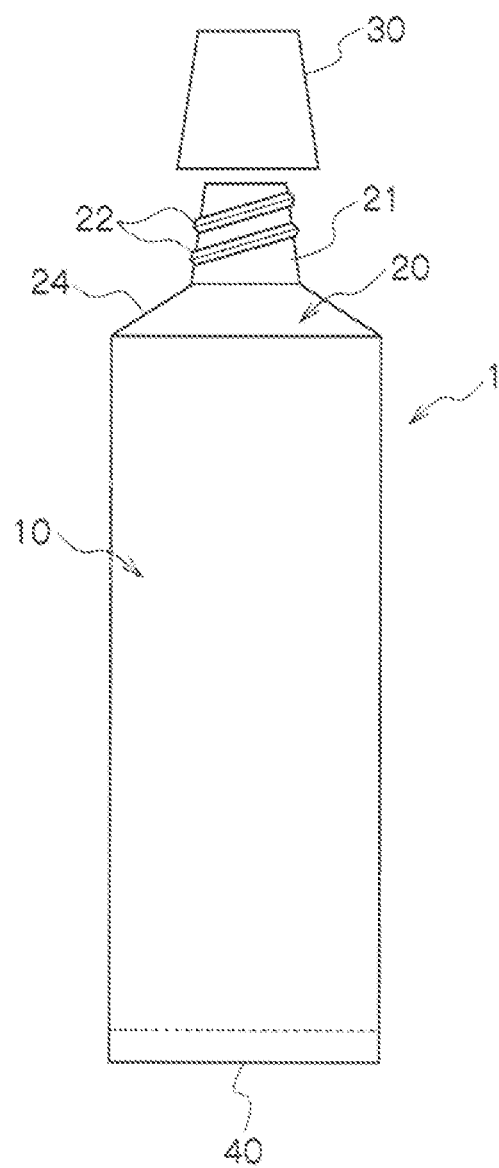
FIG. 9 is a side view illustrating another example of the tubular container according to the present invention.
Figure 10:
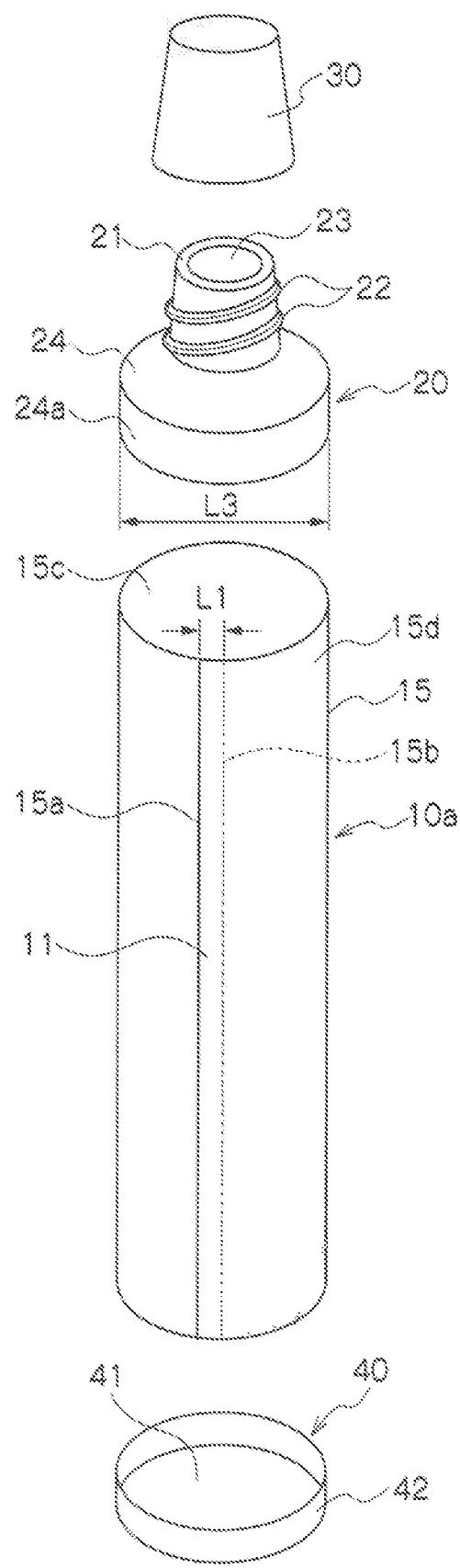
FIG. 10 is an explanatory view of each part of the tubular container illustrated in FIG. 9 for a type in which the body part is formed by overlapping and sealing the side edges of both sides of the laminated film together, and subsequently welded to a lid member.

The body part 10, as illustrated in FIGS. 2 and 4A, is a cylindrical body 10a formed by the laminated film 15. In the body part 10, a first surface side 15c of one side edge 15a of the laminated film 15 is overlapped on a second surface side 15d of the other edge 15b, and the overlapped first surface side 15c and second surface side 15d are welded. One end of the body part 10 in the axial direction is welded to an outer peripheral surface 24a of the shoulder part 24 of the outlet unit 20. On the other end of the body part 10 in the axial direction, inner surfaces are aligned, welded together, and closed as illustrated in FIGS. 1 and 2, or at least the surfaces that come into contact with the contents are welded to a lid member 40 made of a non-absorbing resin, and closed as illustrated in FIGS. 9 and 10.

Figure 5:
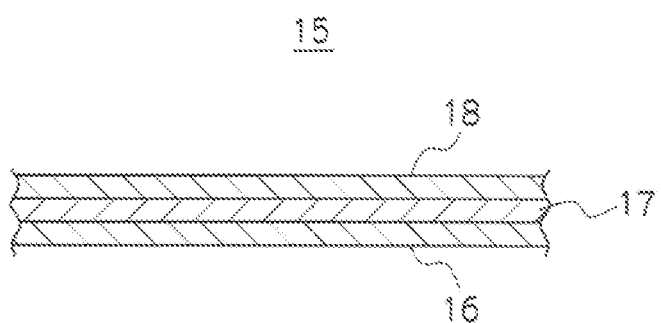
FIG. 5 is a schematic view schematically illustrating a laminated structure of the body part.

The laminated film 15 that constitutes the body part 10 includes at least the innermost layer 16 formed in a position on the inner side that comes into contact with the contents, the outermost layer 18 formed in a position on the outermost side, and the intermediate layer 17 formed between the innermost layer 16 and the outermost layer 18, as illustrated in FIG. 5. Then, the innermost layer 16 and the outermost layer 18 are layers formed from a non-absorbing resin, and the intermediate layer 17 is a layer that comprises at least a gas barrier layer.

According to this tubular container 1, all surfaces of the outlet unit 20 and the body part 10 that come into contact with the contents are formed from a non-absorbing resin, making it possible to smoothly dispense the contents. Further, because the body part 10 comprises the gas barrier layer, a decrease in the flavor, efficacy, and the like of the contents can be prevented. Additionally, when the outlet unit 20, the body part 10, and the lid member 40 are provided, the surfaces that come into contact with the contents along with the lid member 40 are each formed from a non-absorbing resin. As a result, when the outlet unit 20, the body part 10, and the lid member 40 are provided, each may be formed from a material different from that of the lid member 40, making it possible to increase the degree of freedom of material selection.

This tubular container 1 may have various configurations as long as provided with the basic configuration described above. Specifically, the tubular container 1 may include two forms, a first embodiment illustrated in FIGS. 1 and 2, and a second embodiment illustrated in FIGS. 9 and 10. The tubular container 1 of the first embodiment is a form in which an end portion of the body part 10 is sealed and closed on a bottom portion side of the tubular container 1. The tubular container 1 of the second embodiment is a form in which the lid member 40 is sealed to the end portion of the body part 10 and closed on the bottom portion side of the tubular container 1.

[Tubular Container of First Embodiment/First Aspect]

The tubular container 1 of the first embodiment, as illustrated in FIGS. 1 and 2, is a form in which opposing inner surfaces of the body part 10 that constitutes the tubular container 1 are sealed together on the bottom portion side of the tubular container 1. This tubular container 1 comprises the body part 10 for storing the contents, and the outlet unit 20 for dispensing the contents.

<Body Part>

The body part 10 is formed by the laminated film 15 and, as illustrated in FIGS. 2 and 4A, comprises a rear surface sealing part 11 and a bottom surface sealing part 12.

One end (outlet unit side end portion) of the body part 10 in the axial direction is welded to the shoulder part 24 of the outlet unit 20. There are various methods for welding one end of the body part 10 in the axial direction and the shoulder part 24 of the outlet unit 20. Examples include a method in which one end of the body part 10 in the axial direction is fitted into the shoulder part 24 constituting the outlet unit 20, and an inner surface of the body part 10 and the outer peripheral surface 24a of the shoulder part 24 are welded.

The rear surface sealing part 11 is an area where the side edges 15a, 15b on both sides of the laminated film 15 having a rectangular shape are overlapped, and the overlapped side edges 15a, 15b are welded. Specifically, in the rear surface sealing part 11, the region from one side of the rectangular laminated film 15 in the left-right direction to a position at a length L1 therefrom, and a region from the other side in the left-right direction to a position at the length L1 therefrom are overlapped. The overlapping is performed by aligning the first surface side 15c of one side edge 15a of the laminated film 15 with the second surface side 15d of the other side edge 15b of the laminated film 15. Note that "side edge" refers to a region between a section of the side of the laminated film 15 and a position on the inner side that is the fixed length L1 from the section of the side, and a section overlapped when the body part 10 is formed.

The bottom surface sealing part 12 is formed by sealing the inner surfaces of the body part 10 together at the other end (bottom side end portion) of the body part 10 in the axial direction. In the bottom surface sealing part 12, as illustrated in FIG. 2, the bottom side of the laminated film 15 and the region from a position of the bottom side to a position at a length L2 therefrom are overlapped at the other end of the body part 10 in the axial direction, that is, at the bottom side end portion of the tubular container. The overlapping is performed by aligning the inner surfaces of the laminated film IS with each other. Note that the reference numeral 12a in FIG. 2 is a section where a region from a lower end of the body part 10 to the length L2 therefrom later serves as a sealing margin of the bottom surface sealing pan 12.

The rear surface sealing part 11 and the bottom surface sealing part 12 are each formed by heat-sealing the overlapped section. Examples of the heat sealing include bar sealing, revolving roll sealing, belt sealing, impulse sealing, high-frequency sealing, and ultrasonic sealing.

<Laminated Film>

The laminated film 15, as illustrated in FIG. 5, comprises at least the innermost layer 16, the intermediate layer 17, and the outermost layer 18. The innermost layer 16 is a layer that is positioned on the inner surface side of the body pan 10 and comes into contact with the contents, and the outermost layer 18 is a layer that constitutes the outermost surface side of the body part 10. Note that other layers may be provided between the innermost layer 16 and the intermediate layer 17, and between the intermediate layer 17 and the outermost layer 18.

(Innermost Layer and Outermost Layer)

The innermost layer 16 and the outermost layer 18 are each formed from a non-absorbing resin. Examples of the non-absorbing resin include a polyester-based resin and a cyclic polyolefin-based resin.

The polyester-based resin used is not particularly limited as long as applicable to the tubular container 1. Examples of the polyester-based resin include a copolymer that contains an acid component with an aromatic dicarboxylic acid as the main component, and a diol component with an aliphatic diol (glycol) as the main component. In this copolymer, the acid component and the diol component are bonded by an ester bond. As the raw material used for the acid component, a derivative that allows ester formation, such as a lower alkyl ester (methyl ester, for example) or an acid halide may also be used.

Examples of the acid component include an aromatic dicarboxylic acid, an aliphatic dicarboxylic acid, and a tricarboxylic acid. Examples of the aromatic dicarboxylic acid include a terephthalic acid, an isophthalic acid, a naphthalene-1,4-dicarboxylic acid, and a naphthalene-2,6-dicarboxylic acid. Examples of the aliphatic dicarboxylic acid include an adipic acid and a sebacic acid. Further, examples of the diol component include an ethylene glycol, a cyclohexane dimethanol, a neopentyl glycol, and a bisphenol compound or an ethylene oxide adduct thereof.

The cyclic polyolefin-based resin used is not particularly limited as long as applicable to the tubular container 1. Examples of the cyclic polyolefin-based resin include polymers of various cyclic olefin monomers. Examples of the cyclic olefin monomers include a bicyclic cycloolefin, a tricyclic cycloolefin, a tetracyclic cycloolefin, and a pentacyclic cycloolefin. Examples of the bicyclic cycloolefin include norbornene, norbornadiene, methyl norbornene, dimethyl norbornene, ethyl norbornene, chlorinated norbornene, chloromethyl norbornene, trimethylsilyl norbornene, phenyl norbornene, cyanonorbornene, dicyanonorbornene, methoxycarbonyl norbornene, pyridyl norbornene, nadic anhydride, and nadic acid imide. Examples of the tricyclic cycloolefin include dicyclopentadiene, dihydrodicyclopentadiene as well as alkyl, alkenyl, alkylidene, and aryl substitutions thereof. Examples of the tetracyclic cycloolefin include dimethano hexahydronaphthalene, dimethano octahydronaphthalene as well as alkyl, alkenyl, alkylidene, and aryl substitutions thereof. Examples of the pentacyclic cycloolefin include tricyclopentadiene, and examples of a hexacyclic cycloolefin include hexacycloheptadecene.

Note that other examples of the cyclic polyolefin include copolymers of a cyclic olefin monomer and another monomer such as ethylene, and hydrogen additives thereof.

Examples of the preferred non-absorbing resin include an isophthalic acid-modified polyethylene terephthalate resin, a cyclic olefin polymer, and a cyclic olefin copolymer.

The non-absorbing resin may include additives. Examples of the additives include antioxidants, lubricants, anti-blocking agents, flame retardants, ultraviolet absorbers, light stabilizers, antistatic agents, and colorants.

Note that while the innermost layer 16 and the outermost layer 18 normally are configured not to contain a resin other than the non-absorbing resin, the innermost layer 16 and the outermost layer 18 may be configured to slightly contain other resins within a range that does not result in a loss in non-absorbing properties. Examples of contained resins include a low density polyethylene (hereinafter "LDPE") and a linear low-density polyethylene (hereinafter "L-LDPE") for the purpose of weldability improvement or flexibility improvement.

The thickness of the innermost layer 16 is 5 μm to 300 μm inclusive, and preferably 10 μm to 100 μm inclusive. With the thickness of the innermost layer 16 set within this range, it is possible to impart non-absorbing properties with respect to the contents of the tubular container 1. The thickness of the outermost layer 18 is 5 μm to 300 μm inclusive, and preferably 10 μm to 100 μm inclusive as well. With the thickness of the outermost layer 18 set within this range, it is possible to increase the non-absorbing properties with respect to the substance of the outer portion of the tubular container 1.

(Intermediate Layer)

The intermediate layer 17 is a layer positioned between the innermost layer 16 and the outermost layer 18, comprises at least one layer, and may be two or more layers. At least one of the layers that constitute the intermediate layer 17 is a gas barrier layer. With the intermediate layer 17 comprising at least the gas barrier layer, it is possible to suppress transmission of gas such as oxygen through the laminated film 15. Examples of such a gas barrier layer include the following. (1) A metal foil having gas barrier properties. (2) A film having gas barrier properties in which a metal such as aluminum or an inorganic oxide having gas barrier properties is deposited on a polyester film, a nylon film, or the like. (3) A resin layer having gas barrier properties such as an ethylene-vinyl alcohol copolymer (EVOH) or a vinylidene chloride.

As the metal foil having gas barrier properties, the various metal foils conventionally used as metal having gas barrier properties may be used. Examples of a representative metal foil include aluminum foil.

Further, a film having gas barrier properties in which a metal such as aluminum or an inorganic oxide having gas barrier properties is deposited on a polyester film, a nylon film, or the like may be used. Examples of the inorganic compound include metal oxides having gas barrier properties, such as silica (silicon oxide) and alumina (aluminum oxide).

Further, conventionally used resins having gas barrier properties may also be applied. Examples include an ethylene-vinyl alcohol copolymer (EVOH), a polyvinyl alcohol, a polyamide resin, polyvinylidene chloride (PVDC), and a fluorine-based resin. Note that the gas barrier layer may be a coating film of a polyvinyl alcohol, or a coating film of polyvinylidene chloride (PVDC). Examples of the polyamide resin used include nylon 6, nylon 66, a nylon 6/66 copolymer, nylon 610, nylon 11, nylon 12, and nylon 13 or the like. Further, Nylon MXD6 (a polyamide resin manufactured by Mitsubishi Gas Chemical Company; called "MX nylon") composed of meta-xylylenediamine and adipic acid or the like may be used.

For such an intermediate layer 17, the gas barrier layers of the forms described above may be used independently or in a combination of two or more types.

The thickness of the intermediate layer 17 is 3 μm to 200 μm inclusive, and preferably 5 μm to 60 μm inclusive. With the thickness of the intermediate layer 17 set within this range, it is possible to impart favorable gas barrier properties.

(Other Layers)

The laminated film 15, while not particularly illustrated in the drawings, may be further provided with a flexible layer. The flexible layer is a layer having the action of improving the flexibility of the laminated film 15, and examples thereof include a polyolefin-based resin layer such as polypropylene (PP) or polyethylene (PE), a thermoplastic elastomer resin layer such as an olefin-based elastomer or a styrene-based elastomer, and an adhesive resin layer made of a polyolefin having adhesiveness. Examples of a polyolefin having adhesiveness include Admer (registered trademark) manufactured by Mitsui Chemicals, Inc., and Modic (registered trademark) manufactured by Mitsubishi Chemical Company. The thickness of the flexible layer is 10 µm to 300 µm inclusive, and preferably 15 µm to 150 µm inclusive. The flexible layer may also be used as, for example, an adhesive layer for adhering the innermost layer 16 and the intermediate layer 17, adhering the intermediate layer 17 and the outermost layer 18, or the like.

The laminated film 15 may also be provided with a reinforcement layer. The reinforcement layer is a layer having the action of supplementing the strength characteristics of the laminated film 15, and examples thereof include a polyolefin-based resin layer such as polypropylene (PP) or polyethylene (PE), and a resin layer such as biaxially oriented polyethylene terephthalate (O-PET), biaxially oriented nylon (O-Ny), or biaxially oriented polypropylene (OPP). The thickness of the reinforcement layer is 3 µm to 500 µm inclusive, and preferably 5 µm to 300 µm inclusive.

The method for manufacturing such a laminated film 15 is not particularly limited, and examples thereof include an extrusion lamination method, a dry lamination method, a coextruding method, and a combination thereof.

<Outlet Unit>

The outlet unit 20, as illustrated in FIGS. 1 and 2, comprises the outlet part 21, and the shoulder part 24 extending radially outward from this outlet part 21.

The outlet part 21 has a cylindrical shape, and a cavity 23 that communicates the inner side and the outer side of the tubular container 1 is formed in the center thereof. The shoulder part 24 has a truncated cone shape, and extends radially outward from a lower end portion of the outlet part 21. Note that the shoulder pan 24 may be formed into a disk shape as well.

In the example of the outlet unit 20 illustrated in FIGS. 1 and 2, a cap 30 is detachably provided to the outlet pan 21. In this outlet unit 20, a male screw 22 having a helical shape is formed on an outer peripheral surface of the outlet part 21, and a female screw (not illustrated) is formed on an inner peripheral surface of the cap 30. In this outlet unit 20, the outlet part 21 is opened and closed by the cap 30 by engaging the male screw 22 of the outlet pan 21 and the female screw of the cap 30, and turning the cap 30 with respect to the outlet part 21.

Figure 6:
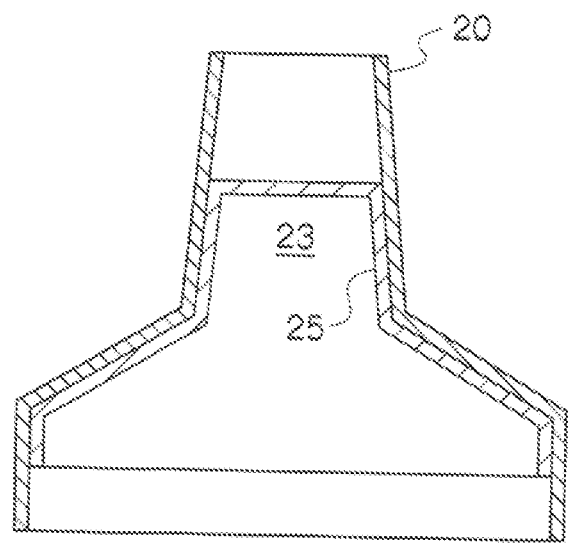
FIG. 6 is a longitudinal section view of an outlet unit comprising a membrane.

Note that, rather than the cap 30 being provided to the outlet unit 20, the outlet unit 20 itself may be made to function as a lid. In this case, for example, the cavity 23 is closed in a position on an upper surface of the outlet part 21 by a material constituting the outlet part 21 itself. Then, when the contents are to be dispensed, a hole is made in the upper surface of the outlet part 21 to dispense the contents. Further, as illustrated in FIG. 6, a membrane 25 is fabricated using the material that constitutes the outlet part 21 itself, and the cavity 23 is closed from the inner side of the outlet unit 20. Then, when the contents are to be dispensed, a hole is made in the membrane 25 inside the cavity 23 to dispense the contents. Such means makes it possible to achieve a tubular container having greater superiority in gas barrier properties. When the membrane 25 is provided to the outlet unit 20, the cap 30 may also be detachably provided to the outlet part 21 of the outlet unit 20.

The width of the shoulder part 24 of the outlet unit 20 is preferably a dimension that allows easy weld with the outlet unit 20 inserted into an opened one end of the body part 10. As the width of such a shoulder part 24, a length L3 that connects the points of the shoulder part 24 that are farthest away from each other is smaller than the dimension of the opened one end of the body part 10 and, specifically, is preferably small, within the range of 100 µm to 1000 µm inclusive.

Figure 7A:
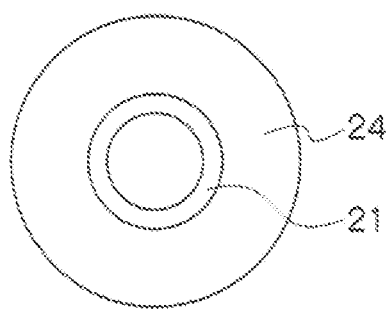
FIGS. 7A to 7D are plan views illustrating examples of shapes of a shoulder part of the outlet unit.
Figure 7B:
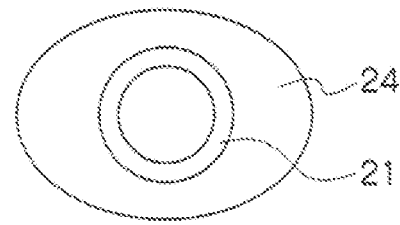
Figure 7C:
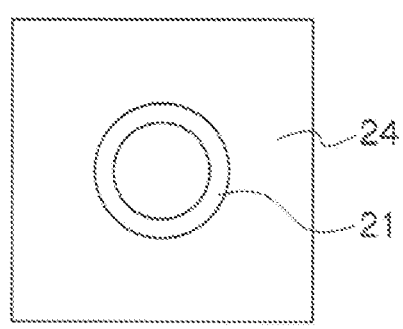
Figure 7D:
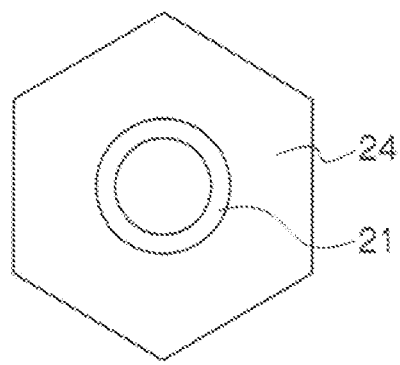

The shape of the shoulder part 24 of this outlet unit 20 is not particularly limited. Examples of the shape of the shoulder part 24 of the outlet unit 20 include the circular or substantially circular shape illustrated in FIG. 7A or the elliptical or substantially elliptical shape illustrated in FIG. 7B, in a planar view of the outlet unit 20. Further, the shoulder part 24 of the outlet unit 20 may have a polygonal shape, such as the quadrilateral shape illustrated in FIG. 7C or the hexagonal shape illustrated in FIG. 7D.

Figure 8A:
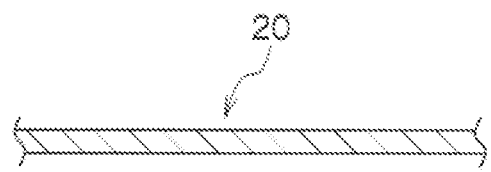
FIGS. 8A and 8B are schematic views schematically illustrating layer structures of the outlet unit.
Figure 8B:
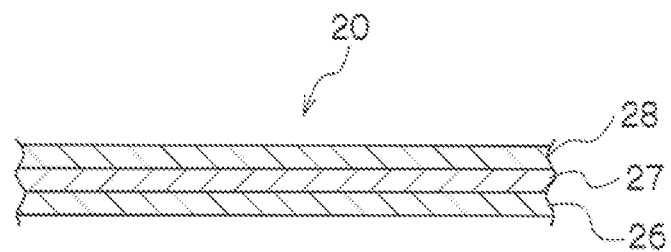

The outlet unit 20 may have the single layer structure illustrated in FIG. 8A or the multilayer structure illustrated in FIG. 8B. Note that, even when the outlet unit 20 has either the single layer structure illustrated in FIG. 8A or the multilayer structure illustrated in FIG. 8B, at least the surfaces that come into contact with the contents are molded using a non-absorbing resin.

When the outlet unit 20 has the single layer structure illustrated in FIG. 8A, the outlet unit 20 is formed from a non-absorbing resin. The non-absorbing resin is the same as the non-absorbing resin constituting the innermost layer 16 and the outermost layer 18 of the body part 10 described above, and thus a description thereof will be omitted. This outlet unit 20 may include other resins, additives, and the like within a range that does not result in a loss in non-absorbing properties. Examples of other resins include a low density polyethylene (hereinafter "LDPE") and a linear low-density polyethylene (hereinafter "L-LDPE") for the purpose of weldability improvement or flexibility improvement. Examples of the additives include antioxidants, lubricants, anti-blocking agents, flame retardants, ultraviolet absorbers, light stabilizers, antistatic agents, organic fillers, inorganic fillers, and colorants.

When the outlet unit 20 has a single layer structure, the thickness of the outlet unit 20 is 50 µm to 50 mm inclusive, and preferably 300 µm to 30 mm inclusive.

When the outlet unit 20 has a multilayer structure as illustrated in FIG. 8B, the outlet unit 20 comprises an innermost layer 26, an intermediate layer 27, and an outermost layer 28. The innermost layer 26 and the outermost layer 28 are formed from a non-absorbing resin similar to the non-absorbing resin constituting the innermost layer 16 and the outermost layer 18 of the body part 10 described above. On the other hand, the intermediate layer 27 preferably comprises the same gas barrier layer as the layer configuration of the body part 10.

When a material that does not allow coextrusion of the innermost layer 16 and the outermost layer 18, such as a metal foil or a film on which a metal such as aluminum or an inorganic oxide is deposited, is used for the intermediate layer 27, a molding method such as insert molding is used.

When a resin that includes an ethylene-vinyl alcohol copolymer (EVOH) is used for the intermediate layer 27, the thickness of the intermediate layer 27 is 5 µm to 200 µm inclusive, and preferably 10 µm to 100 µm inclusive.

When a resin that includes nylon is used for the intermediate layer 27, examples of the nylon include a polyamide resin, such as nylon 6 and nylon 66. Further, a metal deposited nylon such as an aluminum-deposited nylon may be applied to the intermediate layer 27. The thickness of such an intermediate layer 27 is 1 µm to 200 µm inclusive, and preferably 10 µm to 100 µm inclusive.

The outlet unit 20 described above can be manufactured by, for example, an injection molding method, an extrusion molding method, a pressure molding method, a drawing molding method, a compression molding method, or an insert molding method.

<Contents>

The contents of the tubular container 1 are not particularly limited. Examples of the contents of the tubular container 1 include food and drink, cosmetics, medicines, and the like that contain flavoring and active ingredients that are low molecular weight organic compounds. This tubular container 1 has superior non-absorbing properties, making it possible to suppress the adsorption of the low molecular weight organic compound included in the contents in the tubular container 1 and thus a change in flavor and a decrease in efficacy of the contents.

<Method for Manufacturing Tubular Container>

A method for manufacturing the tubular container 1 comprises the steps of preparing the outlet unit 20 and the laminated film 15 (preparing step), welding both side edges of the prepared laminated film 15 together to form the cylindrical body part 10 (body part forming step), welding one end side of the formed body part 10 in the axial direction to the peripheral surface of the shoulder part 24 of the prepared outlet unit 20 (welding step), and welding and closing the other end side of the body part 10 in the axial direction (bottom surface sealing step). Note that, in the stage of the semi-finished product in which the body part 10 is welded to the outlet unit 20, the body part 10 is filled with the contents from the other end side thereof in the axial direction. The other end side of the body part 10 in the axial direction is welded and closed after the body part 10 is filled with the contents.

The preparing step is a step of preparing the outlet unit 20 and the laminated film 15. The laminated film 15 is manufactured and prepared by the method described in the description area of the laminated film 15 described above. The outlet unit 20 is also manufactured and prepared by the method described in the description area of the outlet unit 20 described above.

The body part forming step is a step of forming the body part 10 using the prepared laminated film 15. The body part 10 becomes the cylindrical body 10a having a cylindrical shape by overlapping both side edges 15a, 15b of the rectangular laminated film 15, and welding the overlapping portion. The overlapped regions are the region from one side of the rectangular laminated film 15 in the left-right direction to a position at the length L1 therefrom, and the region from the other side in the left-right direction to a position at the length L1 therefrom. At this time, as illustrated in FIG. 4A, the first surface side 15c of one side edge 15a of the laminated film 15, and the second surface side 15d of the other side edge 15b of the laminated film 15 are overlapped, facing each other.

Next, the overlapped sections are welded. The welding is performed by heat sealing. Examples of the heat sealing include bar sealing, revolving roll sealing, belt sealing, impulse sealing, high-frequency sealing, and ultrasonic sealing. This welded section becomes the rear surface sealing part 11.

In the welding step, one end side of the formed body part 10 in the axial direction is welded to the outer peripheral surface 24a of the shoulder part 24 of the prepared outlet unit 20. This step is a step of welding and joining the outlet unit 20 and the body part 10 where the outer peripheral surface 24a of the shoulder part 24 of the outlet unit 20 is inserted into the inner side of one end side of the body part 10 in the axial direction, and the inserted section is subsequently welded by heat sealing.

Next, the body part 10 is filled with the contents from the other end side thereof in the axial direction.

Subsequently, by the bottom surface sealing step, the other end side of the body part 10 in the axial direction is welded and closed, and the bottom surface sealing part 12 is formed. At this time, the inner surfaces on the other end side of the body part 10 in the axial direction are overlapped and welded together. The welding is performed by heat sealing.

While a separately prepared outlet unit 20 is used in such a method for manufacturing the tubular container 1, the outlet unit 20 may be simultaneously molded and welded to the body part 10.

[Tubular Container of Second Embodiment/First Aspect]

The tubular container 1 of the second embodiment, as illustrated in FIGS. 9 and 10, has the same configuration as that of the tubular container 1 of the first embodiment other than a bottom portion (other end side) of the body part 10 is closed by a bottom lid serving as the lid member 40. Thus, components of the tubular container 1 of the second embodiment that are the same as those of the tubular container 1 of the first embodiment are denoted in drawings using the same reference numerals, and detailed descriptions thereof will be omitted.

The tubular container of the second embodiment comprises the outlet unit 20 that dispenses the contents, the body part 10 welded to this outlet unit 20, and the bottom lid 40 that closes the bottom portion of the body part 10.

The outlet unit 20 comprises the outlet part 21 and the shoulder part 24. The material and configuration of this outlet unit 20 are the same as the material and configuration of the outlet unit 20 that constitutes the tubular container 1 of the first embodiment.

The body part 10 is formed by the laminated film 15. The material of the body part 10 is the same as the material of the body part 10 that constitutes the tubular container 1 of the first embodiment. On the other hand, the configuration of the body part 10 differs from that of the body part 10 constituting the tubular container 1 of the first embodiment. That is, the outlet unit 20 is attached to one end side thereof in the axial direction, and the bottom lid 40 is attached to the other end side. Note that the method for attaching the body part 10 and the outlet unit 20 is the same as that of the tubular container 1 of the first embodiment.

The bottom lid 40 serving as the lid member comprises a bottom surface 41 and a peripheral surface 42, as illustrated in FIG. 10. The bottom surface 41 has a flat disk shape, and has the function of closing the bottom portion of the body part 10. The peripheral surface 42 is a side surface portion along the peripheral edge of the bottom surface, and is an area welded to the bottom portion of the body part 10. While the material and structure of this bottom lid 40 is not particularly limited as long as at least the surfaces that come into contact with the contents are formed from a non-absorbing resin, the bottom lid 40 may be formed into the same structure using the same materials as those of the aforementioned outlet unit 20.

The bottom lid 40 is attached by, for example, inserting the peripheral surface 42 into the bottom portion of the body part 10, and welding the peripheral surface 42 and the inner peripheral surface of the body part 10. Note that, according to the form of the bottom lid 40, the body part 10 may be inserted into the inner side of the peripheral surface 42 of the bottom lid 40, and the bottom portion of the body part 10 and the peripheral surface 42 may be welded.

As described above, according to the tubular container 1 of the first aspect according to the present invention, the body part 10 is formed by the laminated film 15 comprising the innermost layer 16 and the outermost layer 18 formed from a non-absorbing resin, and the surfaces that come into contact with the contents of the outlet unit 20 are formed from a non-absorbing resin, resulting in superior non-absorbing properties with respect to the contents. Note that, even when the bottom lid 40 is provided as in the tubular container 1, the surfaces of the bottom lid 40 that come into contact with the contents are formed from a non-absorbing resin, resulting in superior non-absorbing properties with respect to the contents.

Further, the intermediate layer 17 comprises a gas barrier layer, making it possible to impart gas barrier properties to the tubular container 1. Furthermore, with the outlet unit 20 and the bottom lid 40 having gas barrier properties, it is possible to impart gas barrier properties to the outlet unit 20 and the bottom lid 40 as well.

[Tubular Container of Second Aspect]

<Basic Configuration>

The tubular container 1 according to the second aspect comprises at least the outlet unit 20 for dispensing the contents, and the transparent body part 10 that stores the contents and is welded to the shoulder part 24 of the outlet unit 20. This tubular container 1 is characterized by the body part 10 being transparent.

The outlet unit 20 is the same as that of the tubular container according to the first aspect, and thus a description thereof will be omitted.

Figure 3:
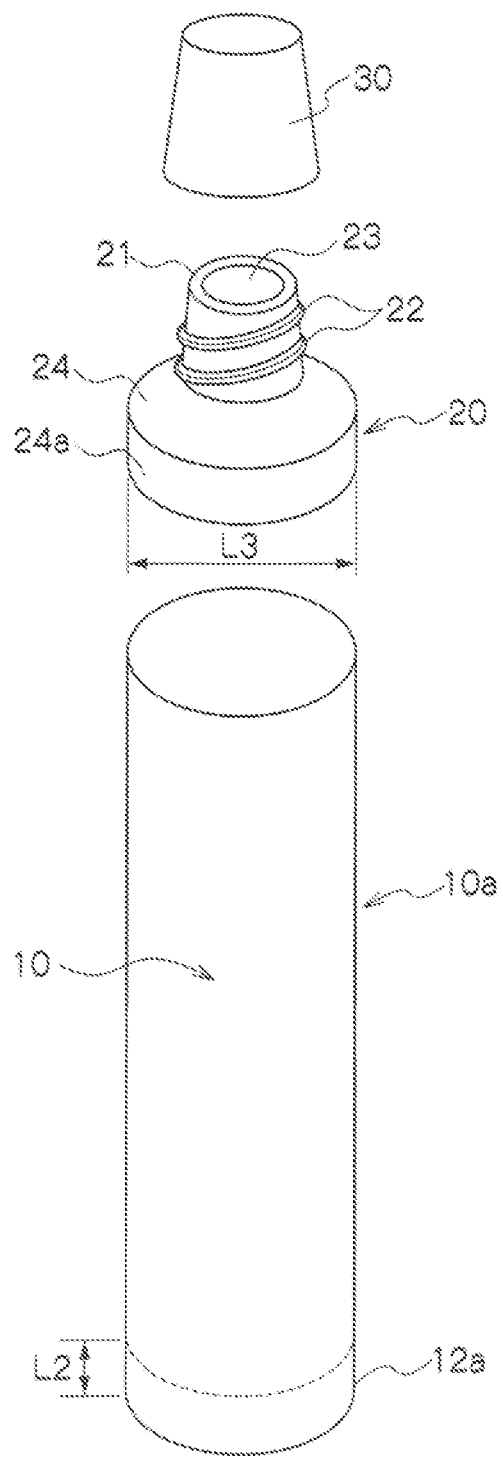
FIG. 3 is an explanatory view of each part of the tubular container illustrated in FIG. 1 for a type in which the body part is formed by extrusion-molding a resin.
Figure 4B:
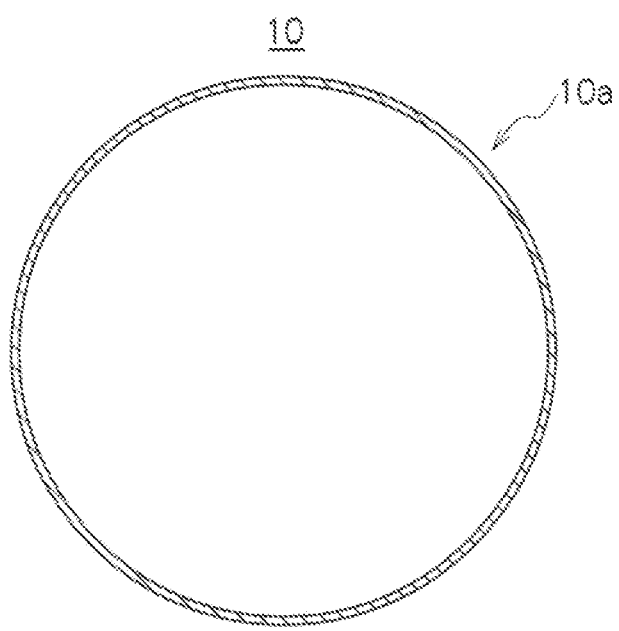
Figure 11:
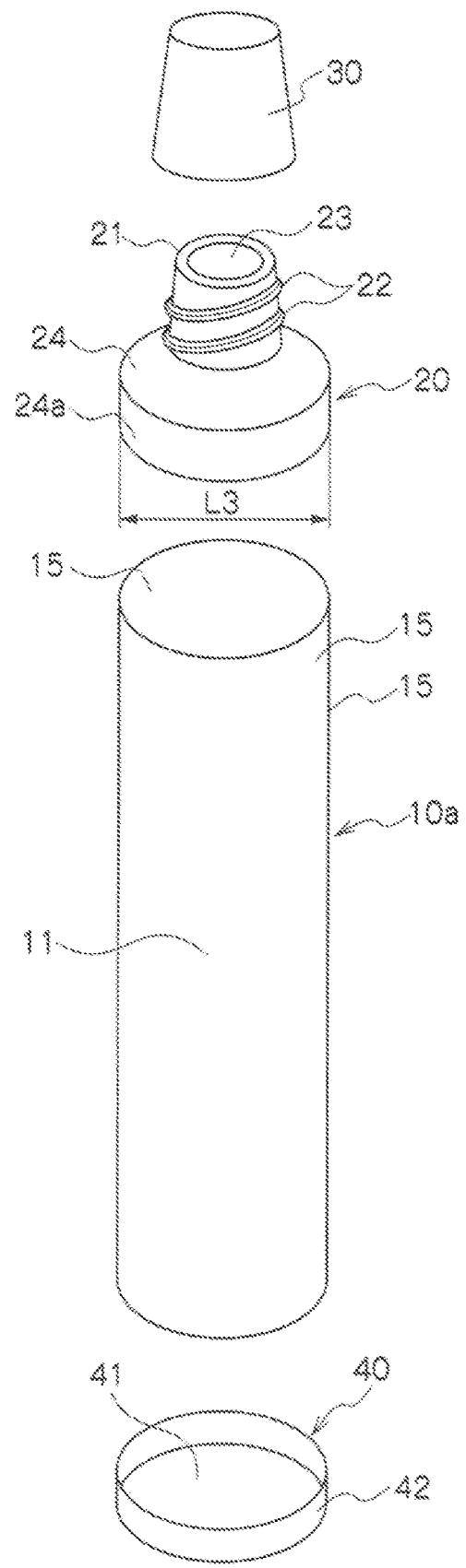
FIG. 11 is an explanatory view of each part of the tubular container illustrated in FIG. 9 for a type in which the body part is formed by extrusion-molding a resin, and subsequently welded to the lid member.

The body part 10, as illustrated in FIGS. 2 and 4A, may be the cylindrical body 10a formed by the laminated film 15. Or, the body part 10 may be the cylindrical body 10a obtained by extrusion molding, as illustrated in FIGS. 3 and 4B. With either of these body parts 10, one end in the axial direction is welded to the shoulder part 24 of the outlet unit 20. At the other end of the body part 10 in the axial direction, the inner surfaces are aligned, welded together, and closed as illustrated in FIGS. 1 to 3. Or, the other end of the body part 10 in the axial direction is closed by weld to the lid member 40 in which at least the surfaces that come into contact with the contents are made of a non-absorbing resin, as illustrated in FIGS. 9 to 11.

The body part 10 includes at least the innermost layer 16 formed in a position on the inner side that comes into contact with the contents, the outermost layer 18 formed in a position on the outermost side, and the intermediate layer 17 formed between the innermost layer 16 and the outermost layer 18. Then, the innermost layer 16 is a layer formed from a non-absorbing resin, and the intermediate layer 17 is a layer that comprises at least a gas barrier layer.

According to this tubular container 1, the intermediate layer 17 that comprises at least the gas barrier layer constituting the transparent body part 10 is included, making it possible to check the contents from outside the tubular container 1, and imparting gas barrier properties. As a result, the residual amount and the like of the contents can be visually checked, and a decrease in the flavor, efficacy, and the like of the contents can be suppressed. Further, the innermost layer 16 of the body part 10 is formed from a non-absorbing resin, making it possible to smoothly dispense the contents without causing the contents to remain inside the body part. Additionally, the body part 10 may be formed into a cylindrical shape by extrusion molding or by overlapping the side edges of the rectangular laminated film, making it possible to achieve the tubular container 1 having various forms. Note that, in the tubular container proposed in Patent Document 4, the state, residual amount, or the like of the contents could not be visually checked from outside the tubular container when the gas barrier layer was configured using aluminum foil. Further the tubular container in Patent Document 4 uses a polyethylene resin in the innermost layer, resulting in the disadvantage of inferior non-absorbing properties with respect to the contents. The present invention was made to resolve such problems, and therefore provides a tubular container that has non-absorbing properties as well as gas barrier properties, and allows the contents to be visually checked from outside the tubular container.

This tubular container 1, similar to the tubular container according to the first aspect, may have various configurations as long as provided with the basic configuration described above. Specifically, the tubular container may include two forms, the first embodiment illustrated in FIGS. 1 to 3, and the second embodiment illustrated in FIGS. 9 to 11. The tubular container 1 of the first embodiment is a form in which the end portions of the body part 10 are sealed and closed on the bottom portion side of the tubular container 1, and the tubular container 1 of the second embodiment is a form in which the lid member 40 is sealed to the end portion of the body part 10 and closed on the bottom portion side of the tubular container 1.

[Tubular Container of First Embodiment/Second Aspect]

The tubular container 1 of the first embodiment, as illustrated in FIGS. 1 and 3, is a form in which opposing inner surfaces of the body part 10 are sealed together on the bottom portion side of the tubular container 1. This tubular container 1 comprises the body part 10 for storing the contents, and the outlet unit 20 for dispensing the contents.

<Body Part>

The body part 10 is transparent, and includes a type in which the side edges on both sides of the laminated film 15 are overlapped and sealed together as illustrated in FIG. 4A, and a type in which a resin is directly formed by extrusion molding as illustrated in FIG. 4B.

One end of the body part 10 in the axial direction is welded to the shoulder part 24 of the outlet unit 20. There are various methods for welding one end of the body part 10 in the axial direction and the shoulder part 24 of the outlet unit 20. Examples include a method in which one end of the body part 10 in the axial direction is fitted into the shoulder part 24 constituting the outlet unit 20, and an inner surface of the body part 10 and the outer peripheral surface 24a of the shoulder part 24 are welded.

The body part 10 of the type illustrated in FIG. 4A is a transparent body part in which the overlapped side edges of the rectangular laminated film 15 are sealed together, and comprises the rear surface sealing part 11 and the bottom surface sealing part 12. The method for obtaining the laminated film 15 is not particularly limited, and examples thereof include an extrusion lamination method, a dry lamination method, a coextruding method, and a combination thereof.

The rear surface sealing part 11 of the body part 10 of this type is the same as that in the case of the tubular container according to the first aspect, and thus a description thereof will be omitted. Further, the bottom surface sealing part 12 of the body part 10 of this type is also the same as that in the case of the tubular container according to the first aspect, and thus a description thereof will be omitted. The rear surface sealing part 11 and the bottom surface sealing part 12 are each formed by heat-sealing the overlapped section. Examples of the heat sealing include bar sealing, revolving roll sealing, belt sealing, impulse sealing, high-frequency sealing, and ultrasonic sealing.

The body part 10 of the type illustrated in FIG. 4B is a transparent body part formed by extrusion-molding a resin.

In the bottom surface sealing part 12 of the body part 10 of this type, the bottom side of the body part 10 and the region from the position of the bottom side to the position at the length L2 therefrom are overlapped at the end portion on the other side of the cylindrical extrusion-molded body part 10 in the axial direction, that is, at the bottom side end portion of the tubular container 1. The overlapping is performed by aligning the inner surfaces of the body part 10 with each other. Note that the reference numeral 12a in FIG. 3 is a section where a region from the lower end of the body part 10 to the length L2 therefrom later serves as a sealing margin of the bottom surface sealing part 12. This bottom surface sealing part 12 is formed by heat-sealing the overlapped section. The heat sealing method is the same as described above.

<Structure of Body Part>

The body part 10 is a multilayer structure (also called a laminated structure) for both the type illustrated in FIG. 4A and the type illustrated in FIG. 4B. FIG. 5 illustrates an example of the layer structure of the body part 10, and the body part 10 comprises at least the innermost layer 16, the intermediate layer 17, and the outermost layer 18. The innermost layer 16 is a layer that is positioned on the inner surface side of the body part 10 and comes into contact with the contents, and the outermost layer 18 is a layer that constitutes the outermost surface side of the body part 10. Note that other layers may be provided between the innermost layer 16 and the intermediate layer 17, and between the intermediate layer 17 and the outermost layer 18.

(Innermost Layer)

The innermost layer 16 is a transparent layer having non-absorbing properties that constitutes the inner surface side of the body pan 10. This innermost layer 16 is formed from a non-absorbing resin.

Examples of the non-absorbing resin include a polyester-based resin and a cyclic polyolefin-based resin, similar to those described in the description area of the tubular container according to the first aspect. Note that the non-absorbing resins such as the polyester-based resin and the cyclic polyolefin-based resin are similar to those described in the description area of the tubular container according to the first aspect, and thus descriptions thereof will be omitted. The thickness of the innermost layer 16 is also the same, and thus descriptions thereof will be omitted.

(Intermediate Layer)

The intermediate layer 17 is a transparent layer positioned between the innermost layer 16 and the outermost layer 18, comprises at least one layer, and may be two or more layers. At least one of the layers that constitute the intermediate layer 17 is a transparent gas barrier layer. With the intermediate layer 17 comprising at least the gas barrier layer, it is possible to suppress the transmission of gas such as oxygen through the laminated film 15. Examples of such a gas barrier layer include the following. (1) A transparent resin layer having gas barrier properties. (2) A transparent film having gas barrier properties in which an inorganic compound having gas barrier properties is deposited on a polyester film or a nylon film.

(1) When the gas barrier layer is a transparent resin layer, examples of the resin constituting the gas barrier layer include an ethylene-vinyl alcohol copolymer (EVOH), a polyvinyl alcohol, a polyamide resin, polyvinylidene chloride (PVDC), and a fluorine-based resin. Note that, when the body part 10 is formed using the laminated film 15, the gas barrier layer may be a coating film of a polyvinyl alcohol, or a coating film of polyvinylidene chloride (PVDC).

Examples of the used polyamide resin described above include nylon 6, nylon 66, a nylon 6/66 copolymer, nylon 610, nylon 11, nylon 12, and nylon 13. Further, Nylon MXD6 (a polyamide resin manufactured by Mitsubishi Gas Chemical Company; called "MX nylon") composed of meta-xylylenediamine and adipic acid or the like may be used.

With the ability to form the gas barrier layer from the above-described resin, it is possible to make the gas barrier layer transparent. Further, when the tubular container 1 is manufactured using the body part 10 that comprises the gas barrier layer formed from the above-described resin, the transparent body part may be manufactured using a laminated film including the gas barrier layer based on the above-described resin or by extrusion molding, making it possible to achieve a tubular container having various forms.

(2) When the gas barrier layer is a transparent film having gas barrier properties in which an inorganic compound having gas barrier properties is deposited on a polyester film or a nylon film, examples of the inorganic compound include metal oxides having gas barrier properties, such as silica (silicon oxide) and alumina (aluminum oxide).

The intermediate layer 17 described above may be a transparent gas barrier layer and a transparent film having gas barrier properties in which an inorganic compound having gas barrier properties is deposited on a polyester film or a nylon film, each used independently or in a combination of two or more types.

The thickness of the intermediate layer 17 is 3 μm to 200 μm inclusive, and preferably 5 μm to 60 μm inclusive. With the thickness of the intermediate layer 17 set within this range, it is possible to impart favorable gas barrier properties.

Note that, in the intermediate layer 17, the gas barrier layer may have oxygen absorbency, or may comprise an oxygen absorbing layer separate from the gas barrier layer. With the intermediate layer 17 comprising a layer having such oxygen absorbency (a gas barrier layer and an oxygen absorbing layer), the intermediate layer 17 absorbs the oxygen that exists inside the tubular container 1, making it possible to suppress the occurrence of oxidation of the contents and the like.

The oxygen absorbency may be imparted as a function of the intermediate layer 17 by a gas barrier layer containing a substance having oxygen absorbency, or another resin layer (oxygen absorbing layer) containing a substance having oxygen absorbency. Examples of the substance having oxygen absorbency include polyterpenes such as poly (α-pinene), poly (β-pinene), and poly (dipentene), which are conjugated diene polymers and cyclized conjugated diene polymers. Examples of conjugated diene polymers include homopolymers or copolymers of conjugated diene monomers, and copolymers of a conjugated diene monomer and another copolymerizable monomer. The cyclized conjugated diene polymer is obtained by the cyclization reaction of the conjugated diene polymer in the presence of an acid catalyst, and has a ring structure derived from the conjugated diene monomer units in the molecule. Note that an organic substance having oxygen absorbency makes it possible to suppress the coloring of the resin containing the substance having oxygen absorbency which is associated with the discoloration that occurs when the substance having oxygen absorbency absorbs oxygen.

In the gas barrier layer and the oxygen absorbing layer that contains a substance having oxygen absorbency, an additive is preferably used to increase the oxygen absorbency of the substance having oxygen absorbency, within a range that does not inhibit the effects of the present invention. Examples of the additive include transition metal salts such as titanium oxide, cobalt oleate (II), cobalt naphthenate (II), cobalt 2-ethylhexanoate (II), cobalt stearate (II), and cobalt neodecanoate (II).

As described above, imparting oxygen absorbency to the intermediate layer 17 makes it possible to absorb the oxygen that exists in the interior of the tubular container 1 and suppress the occurrence of oxidation of the contents and the like.

Note that, in the oxygen absorbing layer, the resin that contains the substance having oxygen absorbency is not particularly limited as long as the resin has transparency. Examples of such a resin include an ethylene-vinyl alcohol copolymer (EVOH), a polyvinyl alcohol, a polyamide resin, and polyvinylidene chloride (PVDC). Other examples of the used resin include resins that contain a polyolefin-based resin as the main component. Examples of the polyolefin-based resin include a linear low-density polyethylene (L-LDPE), a low density polyethylene (LDPE), a polypropylene-based resin, and a polyethylene.

(Outermost Layer)

The outermost layer 18 is a transparent layer positioned on the outermost side of the body part 10. While the function of this outermost layer 18 is not particularly limited, for example, the outermost layer 18 preferably has the same non-absorbing properties as those of the innermost layer 16 as well as flexibility, printability, and grease resistance.

The outermost layer 18 having non-absorbing properties is a layer in which both front and rear surfaces (the outermost layer 18 and the innermost layer 16) of the laminated film 15 have non-absorbing properties. This outermost layer 18 having non-absorbing properties may be formed from a non-absorbing resin, similar to the innermost layer 16 described above. The outermost layer 18 and the innermost layer 16 are configured using the same type of resin, resulting in the advantage that sealing by overlapping the side edges on both sides of the laminated film 15 is easier. The outermost layer 18 may be configured using the same resin as the resin described in the description area of the innermost layer 16 described above, and thus a description thereof will be omitted.

The outermost layer 18 having flexibility can improve the flexibility of the body part 10, and therefore is preferably provided. Examples of the outermost layer 18 having flexibility include a polyolefin-based resin such as a polypropylene (PP) or a polyethylene (PE), a silicone-based resin, and a thermoplastic elastomer resin such as an olefin-based elastomer or a styrene-based elastomer.

The thickness of the outermost layer 18 is 5 µm to 300 µm inclusive, and preferably 10 µm to 100 µm inclusive. Further, the thickness of the outermost layer 18 having flexibility is 10 µm to 1000 µm inclusive, and preferably 50 µm to 500 µm inclusive.

(Other Layers)

The body part 10 may comprise other layers as long as at least the innermost layer 16, the intermediate layer 17, and the outermost layer 18 described heretofore are included. For example, the oxygen absorbing layer described above may be provided between the gas barrier layer and the innermost layer along with the gas barrier layer that constitutes the intermediate layer. Further, an adhesive layer may be provided as desired between the innermost layer 16 and the intermediate layer 17, and between the intermediate layer 17 and the outermost layer 18. Furthermore, a flexible layer similar to the outermost layer 18 having flexibility described above may be provided between the innermost layer 16 and the intermediate layer 17. Additionally, a reinforcement layer may be provided between the outermost layer 18 and the intermediate layer 17. Note that the reinforcement layer has the action of supplementing the strength characteristics of the laminated film 15, and examples thereof include a resin layer such as biaxially oriented polyethylene terephthalate (O-PET), biaxially oriented nylon (O-Ny), or biaxially oriented polypropylene (OPP). The thickness of the reinforcement layer is 3 µm to 500 µm inclusive, and preferably 5 µm to 300 µm inclusive.

With the configuration of the body pan 10 described above, it is possible to make the body part 10 transparent and impart gas barrier properties to the body part 10. Further, when each layer of the body part 10 is configured to the aforementioned thicknesses using the aforementioned materials, it is possible to impart to the body part 10 properties (squeezability) that allow the body part 10 to push out and dispense the contents.

<Outlet Unit>

The outlet unit 20, as illustrated in FIGS. 1 to 3, comprises the outlet part 21, and the shoulder part 24 extending radially outward from this outlet part 21. This outlet unit 20 is the same as the outlet unit 20 constituting the tubular container according to the first aspect, and thus a description of duplicate information will be omitted.

(When the Outlet Unit has a Multilayer Structure)

Note that when the outlet unit 20 has a multilayer structure as illustrated in FIG. 8B, the outlet unit 20 comprises the innermost layer 26, the intermediate layer 27, and the outermost layer 28. With the outlet unit 20 in this case, there are two types: a form in which the body part 10 and the outlet unit 20 are configured using separate members, and a form in which the body part 10 and the outlet unit 20 are configured using the same members.

When the outlet unit 20 is configured using a member separate from that of the body part 10, the outlet unit 20 may be configured as follows.

The innermost layer 26 is formed from a non-absorbing resin. The non-absorbing resin is the same as the resin used for the aforementioned innermost layer 16, and thus a description thereof will be omitted.

While not particularly limited, the intermediate layer 27 preferably comprises the same gas barrier layer as that of the body part 10. Preferred examples of the gas barrier layer include a layer formed from metal foil, a film on which a metal such as aluminum or an inorganic oxide is deposited, or a resin that includes an ethylene-vinyl alcohol copolymer (EVOH), vinylidene chloride, or a nylon.

When a material that does not allow coextrusion of the innermost layer 16 and the outermost layer 18, such as a metal foil or a film on which a metal such as aluminum or an inorganic oxide is deposited, is used for the intermediate layer 27, a molding method such as insert molding is used.

When a resin that includes an ethylene-vinyl alcohol copolymer (EVOH) is used for the intermediate layer 27, the thickness of the intermediate layer 27 is 5 µm to 200 µm inclusive, and preferably 10 µm to 100 µm inclusive.

When a resin that includes a nylon is used for the intermediate layer 27, examples of the nylon include a polyamide resin, such as nylon 6 and nylon 66. Further, a metal deposited nylon such as an aluminum-deposited nylon may be applied to the intermediate layer 27. The thickness of the intermediate layer 27 is 1 µm to 200 µm inclusive, and preferably 10 µm to 100 µm inclusive.

While not particularly limited, the outermost layer 28 is also preferably a layer having the same non-absorbing properties as those of the body part 10 or a layer that has flexibility.

The outlet unit 20 described above can be manufactured by, for example, an injection molding method, an extrusion molding method, a pressure molding method, a drawing molding method, a compression molding method, or an insert molding method.

The above has described the tubular container 1 in which the body part 10 and the outlet unit 20 are configured using separate members, and one end side of the body pan 10 and the shoulder part 24 of the outlet unit 20 are welded. When the body part 10 and the outlet unit 20 are configured using separate members, the materials used for layers other than the innermost layer 16 of the body part 10, such as the intermediate layer 17 and the outermost layer 18, for example, may differ from the material of the outlet unit 20, as long as the material of the shoulder part 24 of the outlet unit 20 and the material of the innermost layer 16 of the body part 10 to be welded to the shoulder part 24 are the same.

When the outlet unit 20 is configured using the same member as that of the body part 10, the outlet, unit 20 may be configured as follows. That is, in the tubular container 1, the body part 10 and the outlet unit 20 may be integrally molded using the identical material by extrusion molding. In this case, it is useful to make the layer configuration of the outlet unit 20 and the layer configuration of the body part 10 the same, and mold the innermost layer 26, the intermediate layer 27, and the outermost layer 28 of the outlet unit 20 using the same materials as those constituting the innermost layer 16, the intermediate layer 17, and the outermost layer 18 of the body part 10. Thus, the innermost layer 26 of the outlet unit 20, similar to the innermost layer 16 of the body part 10, may be configured using a non-absorbing resin. The intermediate layer 27 and the outermost layer 28 are the same as those when the outlet unit 20 is configured using a member separate from that of the body part 10, and thus a description thereof will be omitted.

While the outlet unit 20 described above does not need to be transparent, the outlet unit 20 may be transparently formed as necessary.

<Contents>

The contents of the tubular container 1 are also the same as those for the tubular container according to the first aspect described above, and thus a description thereof will be omitted.

<Method for Manufacturing Tubular Container>

The manufacturing method of the tubular container includes the three types described below. The manufacturing method of the first type is a method in which the tubular container is manufactured using the body part 10 manufactured by extrusion molding. The manufacturing method of the second type is a method in which the tubular container is manufactured using the body part 10 manufactured using a laminated film. The manufacturing method of the third type is a method in which the outlet unit and the body part are integrally manufactured by extrusion molding.

(Manufacturing Method of First Type)

The manufacturing method of the first type comprises the steps of molding the body part 10 by extrusion molding, molding the outlet unit 20 and welding one end side of the body part 10 in the axial direction to the peripheral surface of the shoulder part 24 of the outlet unit 20, and welding and closing the other end side of the body part 10 in the axial direction. Note that, in the stage of the semi-finished product in which the body part 10 is welded to the outlet unit 20, the body part 10 may be filled with the contents from the other end side thereof in the axial direction, and the other end side of the body part 10 in the axial direction may be welded and closed after the body part 10 has been filled with the contents. Or, the body part 10 may be welded to the outlet unit 20 and filled via the cavity 23 after the other end side of the body part 10 in the axial direction has been welded and closed.

In the step of molding the body part 10 by extrusion molding, the necessary resin to be configured as the body part 10 is extruded and the body part 10 that has a concentric layer structure is formed.

Next, the step of molding the outlet unit 20 and welding one end side of the body part 10 in the axial direction to the outer peripheral surface of the shoulder part 24 of the outlet unit 20 is performed. In this step, the molding of the outlet unit 20 and the welding of the outlet unit 20 and the body part 10 are performed simultaneously, and one end of the body part 10 in the axial direction is welded by forming the outer peripheral surface 24a of the shoulder part 24 of the outlet unit 20 on the inner side of one end side of the body part 10 in the axial direction.

Subsequently, the step of welding and closing the other end side of the body part 10 in the axial direction is performed. The other end of the body part 10 in the axial direction is welded, and the other end side of the body part 10 in the axial direction is closed. At this time, the inner surfaces on the other end side of the body part 10 in the axial direction are overlapped and welded together. The welding is performed by heat sealing.

Note that the method for manufacturing the tubular container 1 described above is a method in which the outlet unit 20 is simultaneously molded and welded to the body part 10. However, the method for manufacturing the tubular container 1 is not limited to this manufacturing method, and the outlet unit 20 may be separately molded, the shoulder part 24 of the outlet unit 20 may be inserted into the inner side of one end side of the body part 10 in the axial direction, and one end of the body part 10 in the axial direction may be welded by heat sealing or the like to the outer peripheral surface 24a of the shoulder part 24 of the outlet unit 20.

(Manufacturing Method of Second Type)

The manufacturing method of the second type comprises the steps of preparing the laminated film 15, welding both side edges of the laminated film 15 together to form the body part 10, molding the outlet unit 20 and welding one end side of the body part 10 in the axial direction to the peripheral surface of the shoulder part 24 of the outlet unit 20, and welding and closing the other end side of the body part 10 in the axial direction. Note that, in this manufacturing method as well, in the stage of the semi-finished product in which the body part 10 is welded to the outlet unit 20, the body part 10 may be filled with the contents from the other end side thereof in the axial direction, and the other end side of the body part 10 in the axial direction may be welded and closed after the body part 10 has been filled with the contents. Or, the body part 10 may be welded to the outlet unit 20 and filled via the cavity 23 after the other end side of the body part 10 in the axial direction has been welded and closed.

In this manufacturing method, first the step of preparing the laminated film 15 is performed. The laminated film 15 is manufactured by the aforementioned method.

Next, the step of forming the body part 10 is performed. The body part 10 configured as the body part 10 is formed by the rectangular laminated film 15. Both side edges 15a, 15b of the rectangular laminated film 15 are overlapped and formed into the cylindrical body part 10. The overlapped regions are the region from one side of the rectangular laminated film 15 in the left-right direction to a position at the length L1 therefrom, and the region from the other side in the left-right direction to a position at the length L1 therefrom. At this time, as illustrated in FIGS. 4A and 4B, the first surface side 15c of one side edge 15a of the laminated film 15, and the second surface side 15d of the other side edge 15b of the laminated film 15 are overlapped, facing each other.

Next, the overlapped sections of the laminated film 15 are welded. The welding is performed by heat sealing. This welded section is configured as the rear surface sealing part 11. Examples of the heat sealing include bar sealing, revolving roll sealing, belt sealing, impulse sealing, high-frequency sealing, and ultrasonic sealing.

Note that, in the manufacturing method of the second type, the step of welding the outlet unit and the body part and the steps thereafter are the same as those of the manufacturing method of the first type.

(Manufacturing Method of Third Type)

In the manufacturing method of the third type, the steps of the manufacturing method of the first type and the manufacturing method of the second type up to welding the body part 10 and the outlet unit 20 are replaced with a step of integrally molding the body part 10 and the outlet unit 20 by extrusion molding. In the manufacturing method of the third type, the step of filling the body part 10 with contents and the steps thereafter are the same as those of the manufacturing method of the first type and the manufacturing method of the second type.

[Tubular Container of Second Embodiment/Second Aspect]

Next, the tubular container 1 of the second embodiment will be described with reference to FIGS. 10 and 11. The tubular container 1 of the second embodiment has the same configuration as that of the tubular container 1 of the first embodiment other than a bottom portion (other end side) of the body part 10 is closed by the bottom lid 40 serving as the lid member. Thus, components of the tubular container 1 of the second embodiment that are the same as those of the tubular container 1 of the first embodiment are denoted in drawings using the same reference numerals, and detailed descriptions thereof will be omitted.

The tubular container of the second embodiment comprises the outlet unit 20 that dispenses the contents, the body part 10 welded to this outlet unit 20, and the bottom lid 40 that closes the bottom portion of the body part 10. The outlet unit 20 comprises the outlet part 21 and the shoulder part 24. The material and configuration of this outlet unit 20 are the same as the material and configuration of the outlet unit 20 that constitutes the tubular container 1 of the first embodiment.

The body part 10 may be a body part formed by the laminated film 15, or a body part formed by extrusion molding. The material of the body part 10 is the same as the material of the body part 10 that constitutes the tubular container 1 of the first embodiment. On the other hand, the configuration of the body part 10 differs from that of the body part 10 constituting the tubular container 1 of the first embodiment. That is, the outlet unit 20 is attached to one end side thereof in the axial direction, and the bottom lid 40 is attached to the other end side. Note that the method for attaching the body part 10 and the outlet unit 20 is the same as that of the tubular container 1 of the first embodiment.

The bottom lid 40 serving as the lid member comprises the bottom surface 41 and the peripheral surface 42, as illustrated in FIGS. 10 and 11. The bottom surface 41 has a flat disk shape, and has the function of closing the bottom portion of the body part 10. The peripheral surface 42 is a side surface portion along the peripheral edge of the bottom surface, and is an area welded to the bottom portion of the body part 10. While the material and structure of this bottom lid 40 is not particularly limited as long as at least the surfaces that come into contact with the contents are formed from a non-absorbing resin, the bottom lid 40 may be formed into the same structure using the same materials as those of the aforementioned outlet unit 20.

The bottom lid 40 is attached by, for example, inserting the peripheral surface 42 into the bottom portion of the body part 10, and welding the peripheral surface 42 and the inner peripheral surface of the body part 10. Note that, according to the form of the bottom lid 40, the body part 10 may be inserted into the inner side of the peripheral surface 42 of the bottom lid 40, and the bottom portion of the body part 10 and the peripheral surface 42 may be welded.

As described above, according to the tubular container 1 of the second aspect according to the present invention, the body part 10 includes the intermediate layer 17 that comprises at least the transparent gas barrier layer, making it possible to check the contents from outside the tubular container 1, and imparting gas barrier properties. As a result, the residual amount and the like of the contents can be visually checked, and a decrease in the flavor, efficacy, and the like of the contents can be suppressed. Further, the innermost layer 16 of the body part 10 is formed from a non-absorbing resin, making it possible to suppress the absorption of the active ingredients and the like of the contents to the tubular container. Additionally the body part 10 having the layer configuration described above may be obtained by forming a cylindrical member by extrusion molding or by forming a cylindrical member by overlapping the side edges of the rectangular laminated film, making it possible to manufacture the tubular container 1 by a variety of methods.

EXAMPLES

The present invention will be described in further detail below using examples and comparative examples.

The tubular container 1 of Examples 1 to 9 below is the same tubular container as in the first embodiment of the tubular container according to the aforementioned second aspect. Further, the body part was manufactured by extrusion molding. The layer configurations of the body parts of the tubular container 1 of Examples 1 to 9, and the layer configuration of the body part of the tubular container of Comparative Example 1 are shown in Table 1.

TABLE 1

| | Layer Configurations | | | Thickness (μm) | | |
|---|---|---|---|---|---|---|
| | Innermost layer | Intermediate layer | Outermost layer | Innermost layer | Intermediate layer | Outermost layer |
| Example 1 | Isophthalic acid copolymer polyethylene terephthalate | Polyamide-based resin | Isophthalic acid copolymer polyethylene terephthalate | 67 | 36 | 33 |
| Example 2 | Isophthalic acid copolymer polyethylene terephthalate | Polyamide-based resin | Soft polyester-based resin | 83 | 48 | 28 |
| Example 3 | Isophthalic acid copolymer polyethylene terephthalate | Polyamide-based resin | Soft polyester-based resin | 145 | 49 | 17 |
| Example 4 | Isophthalic acid copolymer polyethylene terephthalate | EVOH | Soft polyester-based resin | 93 | 35 | 15 |
| Example 4 | Isophthalic acid copolymer polyethylene terephthalate | EVOH | Soft polyester-based resin | 107 | 59 | 26 |
| Example 6 | Isophthalic acid copolymer polyethylene terephthalate | EVOH | Polyethylene resin | 91 | 34 | 28 |
| Example 7 | Isophthalic acid copolymer polyethylene terephthalate | EVOH | Polyethylene resin | 98 | 54 | 47 |
| Example 8 | Isophthalic acid copolymer polyethylene terephthalate | Polyamide-based resin | Polyethylene resin | 87 | 33 | 33 |
| Example 9 | Isophthalic acid copolymer polyethylene terephthalate | Polyamide-based resin | Polyethylene resin | 113 | 49 | 40 |
| Comparative Example 1 | | Polyethylene terephthalate | | | 125 | |

Example 1

In the tubular container of Example 1, the innermost layer and the outermost layer of the body part were made of isophthalic acid-modified polyethylene terephthalate, and the intermediate layer was made of a polyamide-based resin. IFG-8L manufactured by Bell Polyester Products, Inc. was used as the isophthalic acid-modified polyethylene terephthalate of the innermost layer and the outermost layer, and Nylon MXD6 manufactured by Mitsubishi Gas Chemical Company was used as the polyamide-based resin of the intermediate layer. The thickness of the innermost layer was 67 μm, the thickness of the intermediate layer was 36 μm, and the thickness of the outermost layer was 33 μm.

Example 2

In the tubular container of Example 2, the outermost layer of Example 1 was changed to a soft polyester-based resin. The other conditions were the same as those of Example 1. PRIT30 manufactured by Bell Polyester Products, Inc., having transparency and flexibility was used as the soft polyester of the outermost layer. The thickness of the innermost layer was 83 μm, the thickness of the intermediate layer was 48 μm, and the thickness of the outermost layer was 28 μm.

Example 3

In the tubular container of Example 3, the thickness of the innermost layer, the thickness of the intermediate layer, and the thickness of the outermost layer of Example 2 were formed to 145 μm, 49 μm, and 17 μm, respectively. The other conditions were the same as those of Example 2.

Example 4

In the tubular container of Example 4, an ethylene-vinyl alcohol copolymer (EVOH) was used for the intermediate layer of Example 2. The other conditions were the same as those of Example 2. The thickness of the innermost layer was 93 μm, the thickness of the intermediate layer was 35 μm, and the thickness of the outermost layer was 15 μm.

Example 5

In the tubular container of Example 5, the thickness of the innermost layer, the thickness of the intermediate layer, and the thickness of the outermost layer of Example 4 were formed to 107 μm, 59 μm, and 26 μm, respectively. The other conditions were the same as those of Example 4.

Example 6

In the tubular container of Example 6, the outermost layer of Example 4 was changed to a polyethylene resin. The other conditions were the same as those of Example 4. The thickness of the innermost layer was 91 µm, the thickness of the intermediate layer was 34 µm, and the thickness of the outermost layer was 28 µm.

Example 7

In the tubular container of Example 7, the thickness of the innermost layer, the thickness of the intermediate layer, and the thickness of the outermost layer of Example 6 were formed to 98 µm, 54 µm, and 47 µm, respectively. The other conditions were the same as those of Example 6.

Example 8

In the tubular container of Example 8, the outermost layer of Example 1 was changed to a polyethylene resin. The other conditions were the same as those of Example 1. The thickness of the innermost layer was 87 µm, the thickness of the intermediate layer was 33 µm, and the thickness of the outermost layer was 33 µm.

Example 9

In the tubular container of Example 9, the thickness of the innermost layer, the thickness of the intermediate layer, and the thickness of the outermost layer of Example 8 were formed to 113 µm, 49 µm, and 40 µm, respectively. The other conditions were the same as those of Example 8.

Comparative Example 1

Comparative Example 1 is a container that uses a generally used polyethylene terephthalate as the body part. The body part of the packaging container of Comparative Example 1 has a single layer. In this Comparative Example 1, the thickness of the body part is 125 µm.

[Measurements and Results]

The transmittance, gas barrier properties, and non-absorbing properties of the tubular containers of Examples 1 to 9 and Comparative Example 1 described above were measured. The measurement results of transmittance, gas barrier properties, and non-absorbing properties are shown in Table 2.

TABLE 2

|  | Transmittance (%) | Gas barrier properties | Non-absorbing properties |
| --- | --- | --- | --- |
| Example 1 | 90.6 | ○ | ○ |
| Example 2 | 90.6 | ○ | ○ |
| Example 3 | 90.1 | ○ | ○ |
| Example 4 | 90.5 | ⊚ | ○ |
| Example 5 | 90.7 | ⊚ | ○ |
| Example 6 | 90.9 | ⊚ | ○ |
| Example 7 | 90.9 | ⊚ | ○ |
| Example 8 | 90.8 | ○ | ○ |
| Example 9 | 90.8 | ○ | ○ |
| Comparative Example 1 | 87.4 | X | ○ |

(Transmittance)

Transmittance is the percentage of incident light of a specific wavelength that passes through the sample. For transmittance, the film of the body part cut to a 3 cm-squared size was measured in accordance with Japanese Industrial Standard (JIS) K7105 using NDH4000, a hazemeter manufactured by Nippon Denshoku Industries Co., Ltd.

The transmittance measurement results of Examples 1 to 9 and Comparative Example 1 are shown in Table 2. As shown in Table 2, the transmittance was 90.6% in Example 1, 90.6% in Example 2, 90.1% in Example 3, 90.5% in Example 4, 90.7% in Example 5, 90.9% in Example 6, 90.9% in Example 7, 90.8% in Example 8, and 90.8% in Example 9. On the other hand, the transmittance was 87.4% in Comparative Example 1.

Comparisons of the transmittance of Comparative Example 1 formed by only polyethylene terephthalate and the transmittances of Examples 1 to 9 each revealed that Examples 1 and 2 and Examples 4 to 9 were approximately 1.04 times that of Comparative Example 1, and Example 3 was approximately 1.03 times that of Comparative Example 1. The transmittances of all Examples 1 to 9 were found to be higher than the transmittance of Comparative Example 1.

(Gas Barrier Properties)

The gas barrier properties were measured under the conditions of 30° C. and 70% RH in accordance with Japanese industrial Standard (JIS) K7126 using the OX-TRAN Model 2/20 oxygen transmission rate testing system manufactured by MOCON Inc., and each measured value was converted to a thickness of 400 µm for measured value comparison. Measurement results of gas barrier properties of 3.0 cc/m$^2$·day·atm or greater (which was the measurement result of polyethylene terephthalate (Comparative Example 1)), less than 3.0 cc/m$^2$·day·atm, and 0.5 cc/m$^2$·day·atm or less were assessed as "x (Poor)," "○ (Good)," and "⊚ (Very Good)," respectively.

The assessment results of the gas barrier properties of Examples 1 to 9 and Comparative Example 1 are shown in Table 2. As shown in Table 2, the assessment of Examples 1 to 3 and Examples 8 and 9 is "0" and the assessment of Examples 4 to 7 is "⊚," each indicating favorable gas barrier properties compared to that of Comparative Example 1.

(Non-Absorbing Properties)

For non-absorbing properties, a small bag was fabricated using the body part film, 2.5 ml of a commercial skin lotion that includes α-tocopherol acetate (Vitamin E acetate) as the active ingredient was put into the small bag, and the bag was sealed. Each sealed small bag was opened after storage for periods of one month and three months at 40° C., the residual amount of α-tocopherol acetate in the skin lotion was quantitated by a high-performance liquid chromatography method, and the non-absorbing properties were measured from the residual amount. The measurement results of the non-absorbing properties were all found to be favorable for Examples 1 to 9 and Comparative Example 1, as shown in Table 2.

Descriptions of Reference Numerals

1 Tubular container
10 Body part
10a Cylindrical body
11 Rear surface sealing part
12 Bottom surface sealing part
12a Sealing margin
15 Laminated film
16 Innermost layer
17 Intermediate layer
18 Outermost layer
20 Outlet unit
21 Outlet part
22 Male screw
23 Cavity
24 Shoulder part 24a Outer peripheral surface
26 Innermost layer
27 Intermediate layer
28 Outermost layer
30 Cap
40 Bottom lid (Lid member)

What is claimed is:

1. A tubular container, comprising:
an outlet unit having an outlet part through which contents are dispensed, a shoulder part that extends radially outward from the outlet part, and a membrane fabricated with a same material as a material forming the outlet part and formed on an inner side of the outlet part to close an opening of the outlet part; and
a body part comprising a laminated film and welded to the shoulder part of the outlet unit and configured to store the contents therein,
wherein the laminated film has a one side edge overlapped and welded to the other side edge such that a first surface of the one side edge is welded to a second surface of the other side edge,
the body part has one end in an axial direction welded to an outer peripheral surface of the shoulder part,
the body part has inner surfaces of the other end in the axial direction aligned and welded together or has surfaces that come into contact with the contents welded to a lid member comprising a non-absorbing resin,
the laminated film comprises an innermost layer comprising a non-absorbing resin on an inner side that comes into contact with the contents, an outermost layer comprising a non-absorbing resin on an outermost side, and an intermediate layer which is formed between the innermost layer and the outermost layer and includes a gas barrier layer,
the outlet unit comprises an innermost layer comprising a non-absorbing resin, an outermost layer comprising a non-absorbing resin, and an intermediate layer positioned between the outermost layer and the innermost layer and including a gas barrier layer,
each of the non-absorbing resins included in the tubular container is a same non-absorbing resin which comprises an isophthalic acid-modified polyethylene terephthalate resin, and
the gas barrier layer included in the laminated film of the body part is at least one selected from the group consisting of a metal foil, a metal deposited film, and an inorganic vapor-deposited film, and the gas barrier layer included in the outlet unit is at least one selected from the group consisting of an ethylenevinyl alcohol copolymer, a polyvinyl alcohol, a polyamide resin, polyvinylidene chloride, and a fluorine-based resin.

2. The tubular container according to claim 1, wherein the laminated film comprises at least one layer comprising at least one resin selected from the group consisting of a polyolefin, an adhesive resin, and a thermoplastic elastomer.

3. The tubular container according to claim 1, wherein each of the innermost layer and the outermost layer of the laminated film has a thickness of from 10 to 100 µm.

4. The tubular container according to claim 1, wherein the intermediate layer of the laminated film has a thickness of from 5 to 60 µm.

5. The tubular container according to claim 1, wherein the intermediate layer of the outlet unit comprises an ethylenevinyl alcohol copolymer and has a thickness of from 10 to 100 µm.

6. The tubular container according to claim 1, wherein the laminated film further comprises a flexible layer comprising at least one selected from the group consisting of a polypropylene, a polyethylene, an olefin elastomer, a styrene elastomer, and a polyolefin having adhesiveness.

7. A tubular container, comprising:
an outlet unit having an outlet part through which contents are dispensed, a shoulder part that extends radially outward from the outlet part, and a membrane fabricated with a same material as a material forming the outlet part and formed on an inner side of the outlet part to close an opening of the outlet part; and
a body part welded to the shoulder part of the outlet unit and configured to store the contents therein,
wherein the body part is a transparent body part comprising an innermost layer comprising a non-absorbing resin on an inner side that comes into contact with the contents when the contents are stored in the tubular container, an outermost layer formed on an outermost side, and an intermediate layer which is formed between the innermost layer and the outermost layer and includes a gas barrier layer,
the outlet unit comprises an innermost layer comprising a non-absorbing resin, an outermost layer comprising a non-absorbing resin, and an intermediate layer positioned between the outermost layer and the innermost layer and including a gas barrier layer, each of the non-absorbing resins included in the tubular container is a same non-absorbing resin which comprises an isophthalic acid-modified polyethylene terephthalate resin, and
each of the gas barrier layers included in the tubular container comprises at least one resin selected from the group consisting of an ethylene-vinyl alcohol copolymer resin, a polyvinyl alcohol resin, a polyamide resin, and a polyvinylidene chloride resin.

8. The tubular container according to claim 7, wherein the body part has one end in an axial direction welded to an outer peripheral surface of the shoulder part, and has inner surfaces of the other end in the axial direction aligned and welded together or welded to a lid member.

9. The tubular container according to claim 7, wherein the outlet unit and the body part are integral with one another, the body part has one end and the other end in an axial direction, and inner surfaces of the other end are aligned and welded together or welded to a lid member.

10. The tubular container according to claim 7, wherein the gas barrier layer has oxygen absorbency, or an oxygen absorbing layer is formed between the gas barrier layer and the innermost layer.

11. The tubular container according to claim 7, wherein the intermediate layer is a transparent deposited layer having a gas barrier property.

12. The tubular container according to claim 8, wherein the outlet unit and the body part are integral with one another and comprise the innermost layer, the outermost layer, and the intermediate layer.

13. The tubular container according to claim 8, wherein the gas barrier layer has oxygen absorbency, or an oxygen absorbing layer is formed between the gas barrier layer and the innermost layer.

14. The tubular container according to claim 8, wherein the intermediate layer is a transparent deposited layer having a gas barrier property.

15. The tubular container according to claim 9, wherein the gas barrier layer has oxygen absorbency, or an oxygen absorbing layer is formed between the gas barrier layer and the innermost layer.

16. The tubular container according to claim 9, wherein the intermediate layer is a transparent deposited layer having a gas barrier property.

17. The tubular container according to claim 7, wherein each of the innermost layer and the outermost layer of the body part has a thickness of from 10 to 100 μm.

18. The tubular container according to claim 7, wherein the intermediate layer of the body part has a thickness of from 5 to 60 μm.

19. The tubular container according to claim 7, wherein the intermediate layer of the outlet unit comprises an ethylenevinyl alcohol copolymer and has a thickness of from 10 to 100 μm.

20. The tubular container according to claim 7, wherein the laminated film further comprises a flexible layer comprising at least one selected from the group consisting of a polypropylene, a polyethylene, an olefin elastomer, a styrene elastomer, and a polyolefin having adhesiveness.

\* \* \* \* \*